(12) United States Patent
Akkarakaran et al.

(10) Patent No.: US 11,259,248 B2
(45) Date of Patent: Feb. 22, 2022

(54) HANDLING POWER TRANSITIONS IN NEW RADIO

(71) Applicant: QUALCOMM Incorporated, San Diego, CA (US)

(72) Inventors: Sony Akkarakaran, Poway, CA (US); Yi Huang, San Diego, CA (US); Renqiu Wang, San Diego, CA (US); Seyong Park, San Diego, CA (US); Tao Luo, San Diego, CA (US); Peter Gaal, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/131,276

(22) Filed: Sep. 14, 2018

(65) Prior Publication Data
US 2019/0090201 A1  Mar. 21, 2019

(30) Foreign Application Priority Data
Sep. 18, 2017 (GR) ............................. 20170100419

(51) Int. Cl.
*H04W 72/00* (2009.01)
*H04W 52/14* (2009.01)
(Continued)

(52) U.S. Cl.
CPC ......... *H04W 52/146* (2013.01); *H04L 5/0007* (2013.01); *H04L 5/0053* (2013.01); *H04L 27/2614* (2013.01); *H04W 52/24* (2013.01); *H04W 52/346* (2013.01); *H04W 76/27* (2018.02); *H04L 5/0051* (2013.01); *H04L 5/0073* (2013.01); *H04L 5/0091* (2013.01); *H04W 52/325* (2013.01)

(58) Field of Classification Search
None
See application file for complete search history.

(56) References Cited

U.S. PATENT DOCUMENTS

2006/0019694 A1 * 1/2006 Sutivong ............... H04W 52/20
455/522
2008/0242337 A1 * 10/2008 Sampath ............... H04W 52/16
455/522

(Continued)

FOREIGN PATENT DOCUMENTS

WO  WO-2015023220 A1  2/2015

OTHER PUBLICATIONS

International Search Report and Written Opinion—PCT/US2018/051253—ISA/EPO—dated Feb. 20, 2019.
Taiwan Search Report—TW107132596—TIPO—dated Oct. 14, 2021.

*Primary Examiner* — Sithu Ko
(74) *Attorney, Agent, or Firm* — Patterson & Sheridan, LLP

(57) ABSTRACT

Aspects of the present disclosure provide techniques for handling power transitions in transmissions in new radio (NR) devices. An exemplary method includes changing from using a first transmit power during a first portion of a transmission to a second transmit power during a second portion of the transmission, and taking action to mitigate a potential phase coherence loss associated with the changing from the first transmit power to the second transmit power.

32 Claims, 12 Drawing Sheets

(51) Int. Cl.
*H04L 5/00* (2006.01)
*H04W 76/27* (2018.01)
*H04W 52/24* (2009.01)
*H04W 52/34* (2009.01)
*H04L 27/26* (2006.01)
*H04W 52/32* (2009.01)

(56) References Cited

U.S. PATENT DOCUMENTS

| | | | |
|---|---|---|---|
| 2010/0234040 A1* | 9/2010 | Palanki | H04L 5/0073 455/452.2 |
| 2011/0110257 A1* | 5/2011 | Kim | H04W 52/146 370/252 |
| 2011/0143805 A1* | 6/2011 | Ramasamy | H04W 52/346 455/522 |
| 2011/0170496 A1* | 7/2011 | Fong | H04W 52/244 370/329 |
| 2011/0300805 A1* | 12/2011 | Gaikwad | H04W 52/243 455/63.1 |
| 2013/0016684 A1* | 1/2013 | Attar | H04L 1/0026 370/329 |
| 2013/0114571 A1* | 5/2013 | Das | H04W 24/10 370/336 |
| 2013/0114756 A1* | 5/2013 | Jia | H04J 11/00 375/295 |
| 2013/0230013 A1* | 9/2013 | Seo | H04L 27/2602 370/329 |
| 2014/0036846 A1* | 2/2014 | Wu | H04W 52/325 370/329 |
| 2015/0282123 A1* | 10/2015 | Miao | H04W 48/00 455/450 |
| 2016/0205631 A1 | 7/2016 | Chen et al. | |
| 2017/0230156 A1* | 8/2017 | Fakoorian | H04W 4/70 |
| 2018/0351719 A1* | 12/2018 | Lee | H04L 5/0053 |
| 2019/0182777 A1* | 6/2019 | Zhang | H04L 5/006 |

* cited by examiner

HANDLING POWER TRANSITIONS IN NEW RADIO

CROSS-REFERENCE TO RELATED APPLICATIONS

The present Application for patent claims priority to Greek Application No. 20170100419, filed Sep. 18, 2017, which is assigned to the assignee hereof and hereby expressly incorporated by reference herein in its entirety.

INTRODUCTION

Aspects of the present disclosure relate to wireless communications and, more particularly, to handling power transitions by a wireless communications device transmitting in a new radio (NR) communications system, such as mitigating phase coherence losses caused by changing a power level of a transmitter.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

It may be desirable for transmitters in an NR (e.g., $5^{th}$ Generation Technology Forum (5GTF)) wireless communications system to change a power level in the middle of transmissions. Changing a power level in the middle of a transmission may cause a loss of phase coherence (e.g., of the transmitted waveform). For example, phase coherence may be lost if a power change is not implemented digitally, but is instead implemented via a change in an analog gain stage(s). Loss of phase coherence may be more severe in uplink (UL) transmissions than in downlink (DL) transmissions, because mobile devices (e.g., UEs) may have implementation constraints that base stations (e.g., next generation NodeBs (gNBs)) do not have. For example, an amount of digital gain that a mobile device can generate may be less than an amount of digital gain that a base station can generate.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for mitigating phase coherence loss by a wireless communications device transmitting in a new radio (NR, e.g., a $5^{th}$ generation (5G)) communications system are described herein.

In an aspect, a method for wireless communication is provided. The method may be performed, for example, by a wireless device. The method generally includes determining to use a first transmit power during a first portion of a transmission and a second transmit power during a second portion of the transmission, mitigating a potential phase coherence loss associated with a changing from the first transmit power to the second transmit power, and transmitting the first portion of the transmission using the first transmit power and the second portion of the transmission using the second transmit power.

In an aspect, a method for wireless communication is provided. The method may be performed, for example, by a base station (BS). The method generally includes transmitting a first grant scheduling a user equipment (UE) to transmit a first transmission, wherein the UE changes from using a first transmit power during a first portion of the first transmission to a second transmit power during a second portion of the first transmission, transmitting a second grant scheduling the UE to transmit a second transmission comprising an indication of at least one of the first transmit power or the second transmit power, and receiving the first transmission from the UE, based on the indication.

In an aspect, an apparatus for wireless communication is provided. The apparatus generally includes a processor configured to determine to use a first transmit power during a first portion of a transmission and a second transmit power during a second portion of the transmission, to mitigate a potential phase coherence loss associated with a changing from the first transmit power to the second transmit power, and to transmit the first portion of the transmission using the first transmit power and the second portion of the transmission using the second transmit power, and a memory coupled with the processor.

In an aspect, an apparatus for wireless communication is provided. The apparatus generally includes a processor configured to: transmit a first grant scheduling a user equipment (UE) to transmit a first transmission, wherein the UE changes from using a first transmit power during a first portion of the first transmission to a second transmit power during a second portion of the first transmission, to transmit a second grant scheduling the UE to transmit a second transmission comprising an indication of at least one of the first transmit power or the second transmit power, and to receive the first transmission from the UE, based on the indication, and a memory coupled with the processor.

In an aspect, an apparatus for wireless communication is provided. The method generally includes means for determining to use a first transmit power during a first portion of a transmission and a second transmit power during a second portion of the transmission, means for mitigating a potential phase coherence loss associated with a changing from the first transmit power to the second transmit power, and means for transmitting the first portion of the transmission using the first transmit power and the second portion of the transmission using the second transmit power.

In an aspect, an apparatus for wireless communication is provided. The apparatus generally includes means for transmitting a first grant scheduling a user equipment (UE) to transmit a first transmission, wherein the UE changes from using a first transmit power during a first portion of the first transmission to a second transmit power during a second portion of the first transmission, means for transmitting a second grant scheduling the UE to transmit a second transmission comprising an indication of at least one of the first transmit power or the second transmit power, and means for receiving the first transmission from the UE, based on the indication.

In an aspect, a computer-readable medium for wireless communication is provided. The computer-readable medium includes instructions that, when executed by a processor, cause the processor to perform operations generally including determining to use a first transmit power during a first portion of a transmission and a second transmit power during a second portion of the transmission, mitigating a potential phase coherence loss associated with a changing from the first transmit power to the second transmit power, and transmitting the first portion of the transmission using the first transmit power and the second portion of the transmission using the second transmit power.

In an aspect, a computer-readable medium for wireless communication is provided. The computer-readable medium includes instructions that, when executed by a processor, cause the processor to perform operations generally including transmitting a first grant scheduling a user equipment (UE) to transmit a first transmission, wherein the UE changes from using a first transmit power during a first portion of the first transmission to a second transmit power during a second portion of the first transmission, transmitting a second grant scheduling the UE to transmit a second transmission comprising an indication of at least one of the first transmit power or the second transmit power, and receiving the first transmission from the UE, based on the indication.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
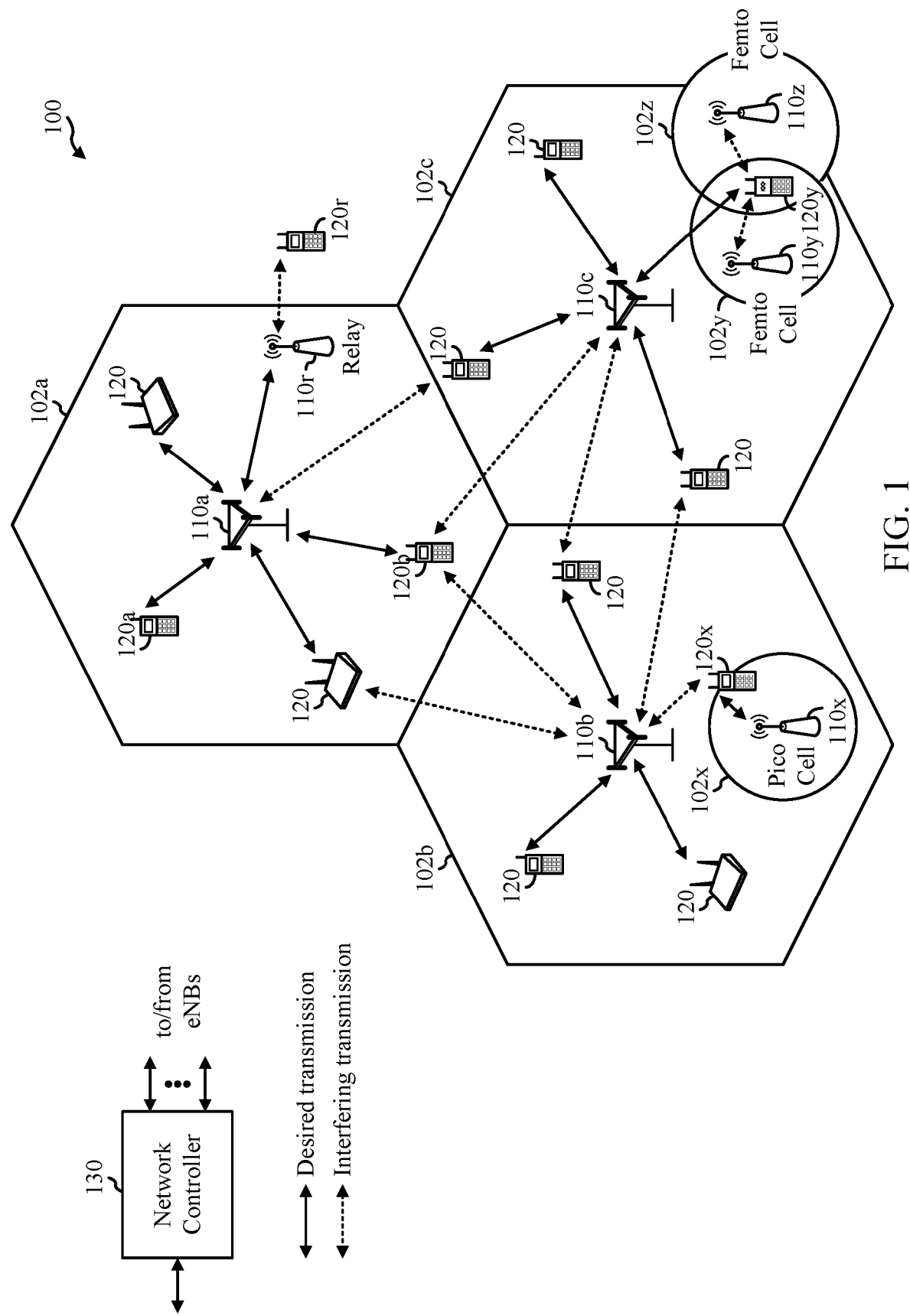
FIG. 1 is a block diagram conceptually illustrating an example telecommunications system, according to aspects of the present disclosure.

Aspects of the present disclosure provide apparatus, methods, processing systems, and computer readable mediums for handling power transitions in new radio (NR) wireless communications systems. According to aspects of the present disclosure described herein, a device may transmit a transmission with different power levels for different portions of the transmission (e.g., different power levels for reference signals and data incorporated in an orthogonal frequency domain multiplexing (OFDM) symbol), and the device may take one or more actions to mitigate a phase coherence loss that may result from the changing power level of the transmission. A phase coherence loss may cause a receiver to experience difficulty in receiving and decoding the transmission, so mitigating the potential phase coherence may improve data throughput rates and/or reduce error rates of communications.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

For clarity, while aspects may be described herein using terminology commonly associated with 3G and/or 4G wireless technologies, aspects of the present disclosure can be applied in other generation-based communication systems, such as 5G and later, including NR technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) techniques targeting wide bandwidth (e.g., 80 MHz and wider) communications, millimeter wave (mmW) techniques targeting high carrier frequency (e.g., 27 GHz and higher) communications, massive machine type communications (mMTC) techniques targeting non-backward compatible machine type communications (MTC), and mission critical techniques targeting ultra reliable low latency communications (URLLC). For these general topics, different techniques are considered, such as coding, including low-density parity check (LDPC) coding, and polar coding. NR cell may refer to a cell operating according to the new air interface or fixed transport layer. A NR Node B (e.g., a 5G Node B) may correspond to one or multiple transmission reception points (TRPs).

NR cells can be configured as access cell (ACells) or data only cells (DCells). For example, the radio access network (e.g., a central unit or distributed unit) can configure the cells. DCells may be cells used for carrier aggregation or dual connectivity, but not used for initial access, cell selection/reselection, or handover. In some cases DCells may not transmit synchronization signals (SS)—in some case cases DCells may transmit SS. TRPs may transmit downlink signals to UEs indicating the cell type. Based on the cell type indication, the UE may communicate with the TRP. For example, the UE may determine TRPs to consider for cell selection, access, handover, and/or measurement based on the indicated cell type.

In some cases, the UE can receive measurement configuration from the radio access network (RAN). The measurement configuration information may indicate ACells or DCells for the UE to measure. The UE may monitor and/or detect measurement reference signals (MRS) from the cells based on measurement configuration information. In some cases, the UE may blindly detect MRS. In some cases the UE may detect MRS based on MRS identifiers (MRS-IDs) indicated from the RAN. The UE may report the measurement results.

Example Wireless Communications System

FIG. 1 illustrates an example wireless network 100 in which aspects of the present disclosure may be performed. For example, the wireless network may be a new radio (NR) or a 5G network.

According to aspects, the wireless network 100 may be a heterogeneous numerology system, wherein UEs 120 within the network 100 may be asynchronous, have different inter-carrier spacing, and/or have different cyclic prefix lengths. According to aspects a BS, such as BS 110a may support different services having different service requirements. For example, the BS 110a may support subframe with different subcarrier spacing. The BS 110a may communicate with UE 120a using a first subcarrier spacing and may communicate with UE 120b using a second subcarrier spacing. UEs 120a, 120b may be configured to operate according to one or more numerologies. In the manner a network may support subframes with different subcarrier spacings.

According to aspects, the subcarrier spacing associated with the different service requirements may be scaled. As a non-limiting example, for illustrative purposes only, the subcarrier spacing may be 15 kHz, 30 kHz, 60 kHz, 120 kHz, and so on (e.g., x1, x2, x4, x8, and so on . . . ). According to another example, the subcarrier spacing may be 17.5 kHz, 35 kHz, and so on (e.g., x1, x2, x3, x4, and so on). Aspects described herein provide methods for tone allocation and resource block definition for heterogeneous numerology systems, which may be beneficial for scheduling devices and communicating with one or more devices in heterogeneous numerology systems.

As described herein, a numerology may be based, at least in part, on a subcarrier spacing and a shift in frequency. The BS 110a and UE 120a may communicate using tones determined using a numerology. Additionally or alternatively, the BS 110a and 120a may communicate using an RB defined using a numerology.

Figure 12:
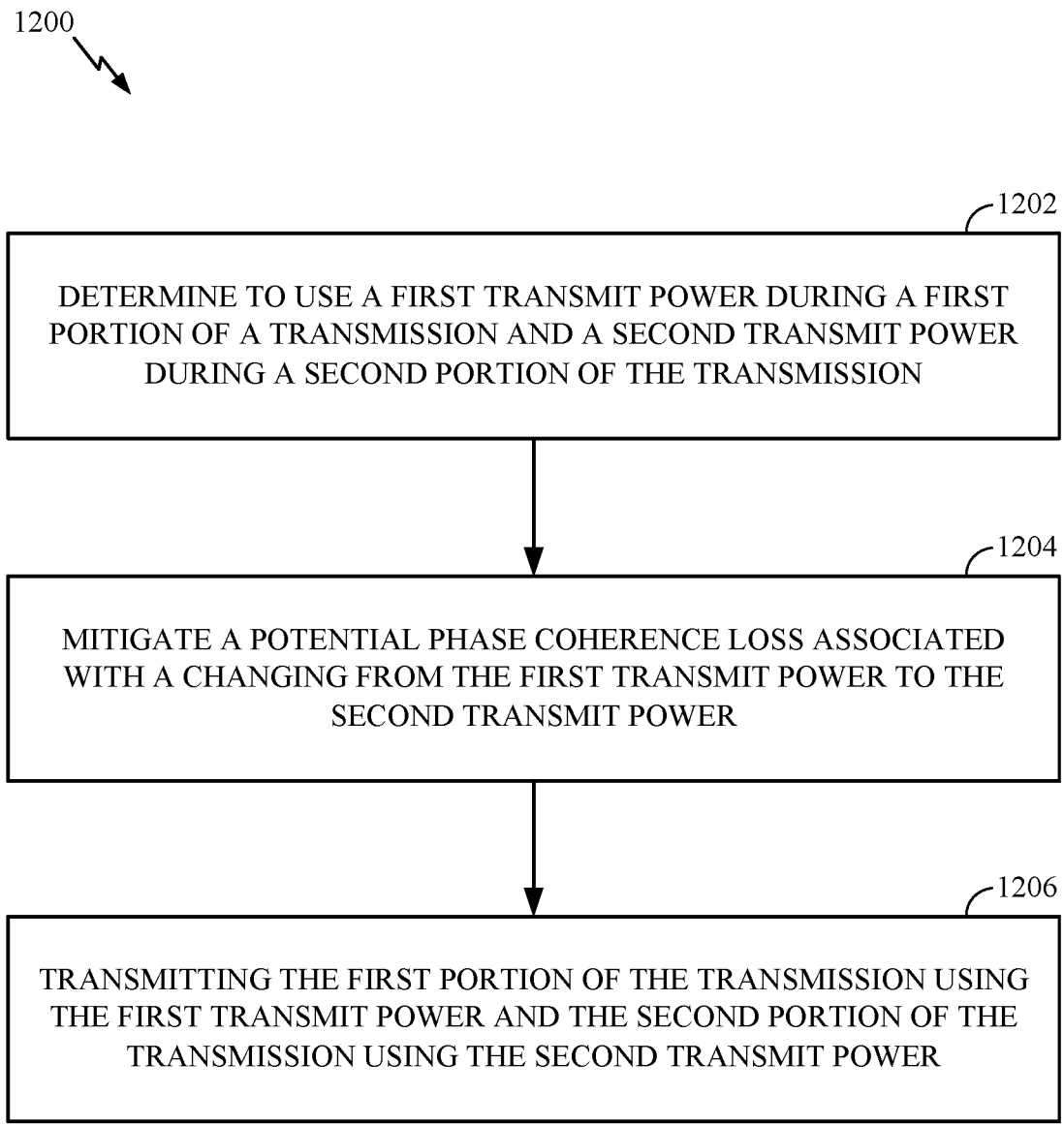
FIG. 12 illustrates example operations that may be performed by a wireless device, according to aspects of the present disclosure.

According to some aspects of the present disclosure, the UE 120 may change from using a first transmit power during a first portion of a transmission to a second transmit power during a second portion of the transmission and take action to mitigate a potential phase coherence loss associated with the changing from the first transmit power to the second transmit power, as described herein with reference to FIG. 12.

Figure 13:
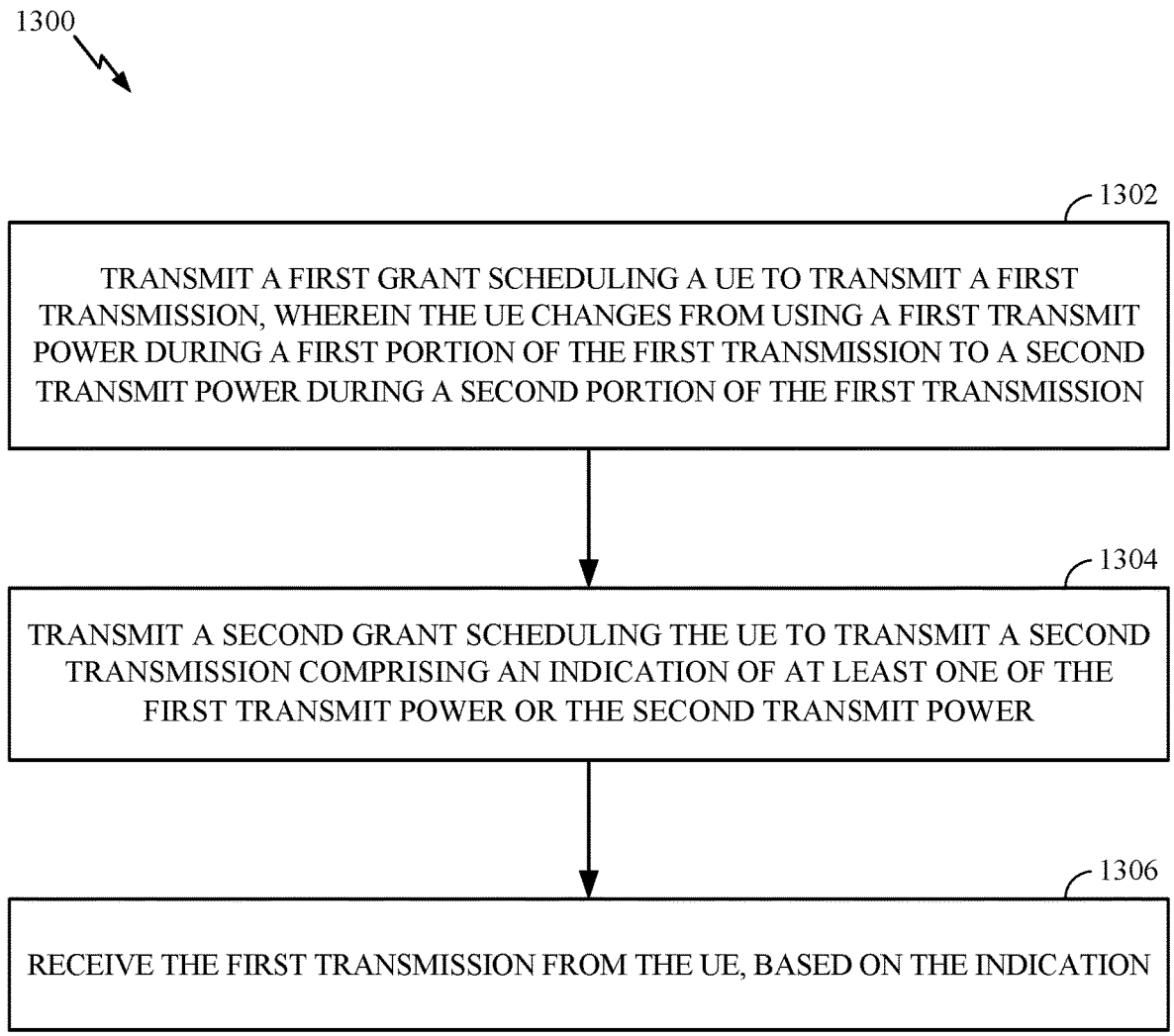
FIG. 13 illustrates example operations that may be performed by a BS, according to aspects of the present disclosure.

According to some aspects of the present disclosure, the BS 110 may be configured to transmit a first grant scheduling a UE (e.g., UE 120) to transmit a first transmission, wherein the UE changes from using a first transmit power during a first portion of the first transmission to a second transmit power during a second portion of the first transmission; to transmit a second grant scheduling the UE to transmit a second transmission comprising an indication of at least one of the first transmit power or the second transmit power; and to receive the first transmission from the UE, based on the indication, as described herein with reference to FIG. 13. Furthermore, the BS 110 and the UE 120 may be configured to perform other aspects described herein, such as changing from using a first transmit power during a first portion of a transmission to a second transmit during a second portion of the transmission and taking action to mitigate a potential phase coherence loss associated with changing the transmit power, described below with reference to FIG. 12. The BS may comprise and/or include a transmission reception point (TRP).

The system illustrated in FIG. 1 may be, for example, a 5G network. The wireless network 100 may include a number of Node Bs (e.g., eNodeBs, eNBs, 5G Node B, etc.) 110 and other network entities. A Node B may be a station that communicates with the UEs and may also be referred to as a base station, an access point, or a 5G Node B.

Each Node B 110 may provide communication coverage for a particular geographic area. In 3GPP and NR systems, the term "cell" can refer to a coverage area of a Node B and/or a Node B subsystem serving this coverage area, depending on the context in which the term is used.

A Node B may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A Node B for a macro cell may be referred to as a macro Node B. A Node B for a pico cell may be referred to as a pico Node B. A Node B for a femto cell may be referred to as a femto Node B or a home Node B. In the example shown in FIG. 1, the Node Bs 110a, 110b and 110c may be macro Node Bs for the macro cells 102a, 102b and 102c, respectively. The Node B 110x may be a pico Node B for a pico cell 102x. The Node Bs 110y and 110z may be femto Node Bs for the femto cells 102y and 102z, respectively. A Node B may support one or multiple (e.g., three) cells.

The wireless network 100 may also include relay stations. A relay station is a station that receives a transmission of data and/or other information from an upstream station (e.g., a Node B or a UE) and sends a transmission of the data and/or other information to a downstream station (e.g., a UE or a Node B). A relay station may also be a UE that relays transmissions for other UEs. In the example shown in FIG. 1, a relay station 110r may communicate with the Node B 110a and a UE 120r in order to facilitate communication between the Node B 110a and the UE 120r. A relay station may also be referred to as a relay Node B, a relay, etc.

The wireless network 100 may be a heterogeneous network that includes Node Bs of different types, e.g., macro Node Bs, pico Node Bs, femto Node Bs, relays, transmission reception points (TRPs), etc. These different types of Node Bs may have different transmit power levels, different coverage areas, and different impact on interference in the wireless network 100. For example, macro Node Bs may have a high transmit power level (e.g., 20 Watts) whereas pico Node Bs, femto Node Bs and relays may have a lower transmit power level (e.g., 1 Watt).

The wireless network 100 may support synchronous or asynchronous operation. For synchronous operation, the Node Bs may have similar frame timing, and transmissions from different Node Bs may be approximately aligned in time. For asynchronous operation, the Node Bs may have different frame timing, and transmissions from different Node Bs may not be aligned in time. The techniques described herein may be used for both synchronous and asynchronous operation.

A network controller 130 may couple to a set of Node Bs and provide coordination and control for these Node Bs. The network controller 130 may communicate with the Node Bs 110 via a backhaul. The Node Bs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro Node Bs, pico Node Bs, femto Node Bs, relays, etc. In FIG. 1, a solid line with double arrows indicates desired transmissions between a UE and a serving Node B, which is a Node B designated to serve the UE on the downlink and/or uplink. A dashed line with double arrows indicates interfering transmissions between a UE and a Node B.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively. New radio (NR) may use a different air interface, other than OFDM-based. NR networks may include entities such as central units or distributed units.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

Figure 2:
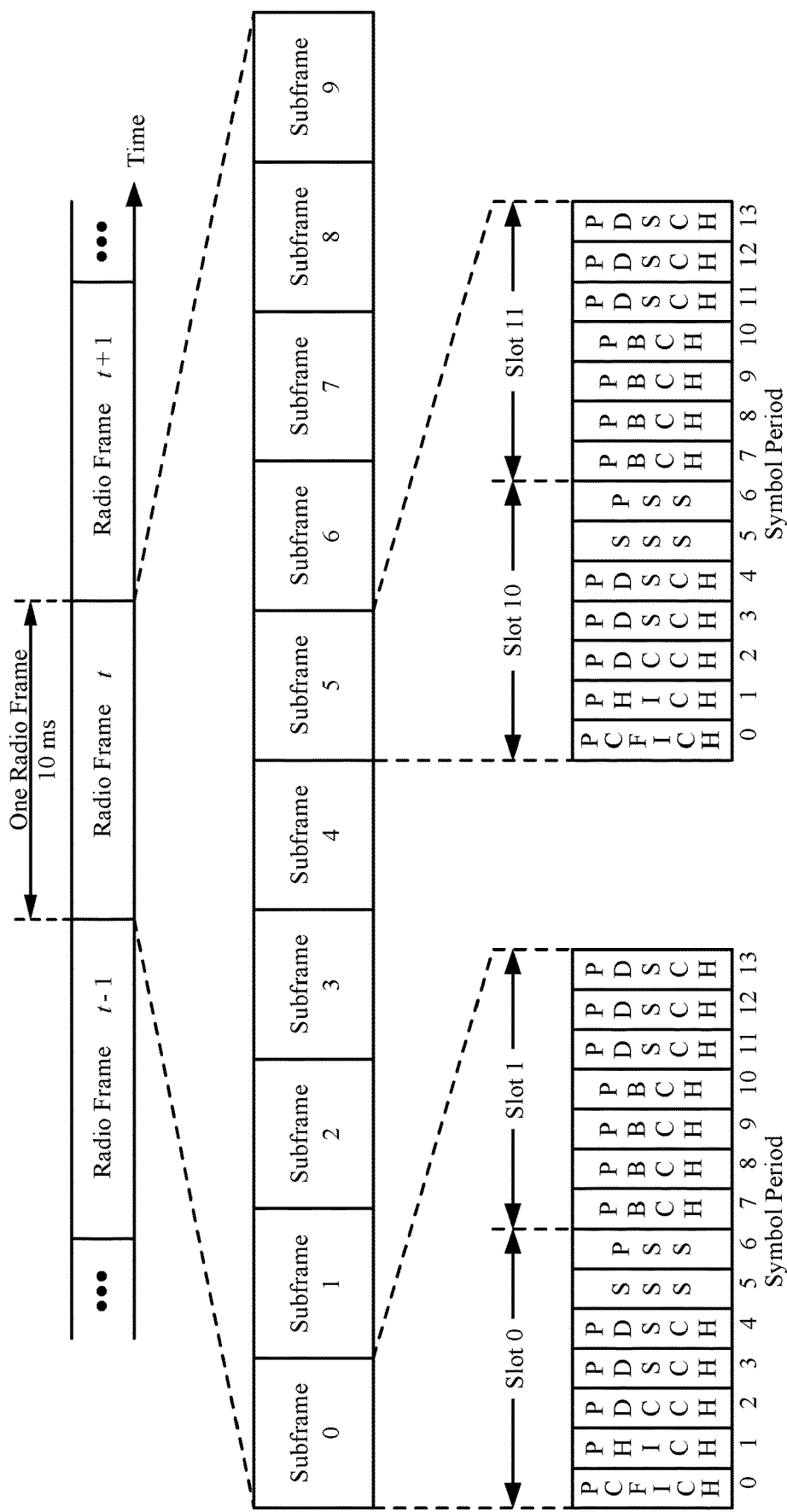
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE, a Node B may send a primary synchronization signal (PSS) and a secondary synchronization signal (SSS) for each cell in the Node B. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The Node B may send a Physical Broadcast Channel (PBCH) in symbol periods 0 to 3 in slot 1 of sub-frame 0. The PBCH may carry certain system information.

The Node B may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The Node B may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The Node B may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The Node B may send the PSS, SSS and PBCH in the center 1.08 MHz of the system bandwidth used by the Node B. The Node B may send the PCFICH and PHICH across the entire system bandwidth in each symbol period in which these channels are sent. The Node B may send the PDCCH to groups of UEs in certain portions of the system bandwidth. The Node B may send the PDSCH to specific UEs in specific portions of the system bandwidth. The Node B may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one sub-carrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A Node B may send the PDCCH to the UE in any of the combinations that the UE will search.

A UE may be within the coverage of multiple Node Bs. One of these Node Bs may be selected to serve the UE. The serving Node B may be selected based on various criteria such as received power, path loss, signal-to-noise ratio (SNR), etc.

Figure 3:
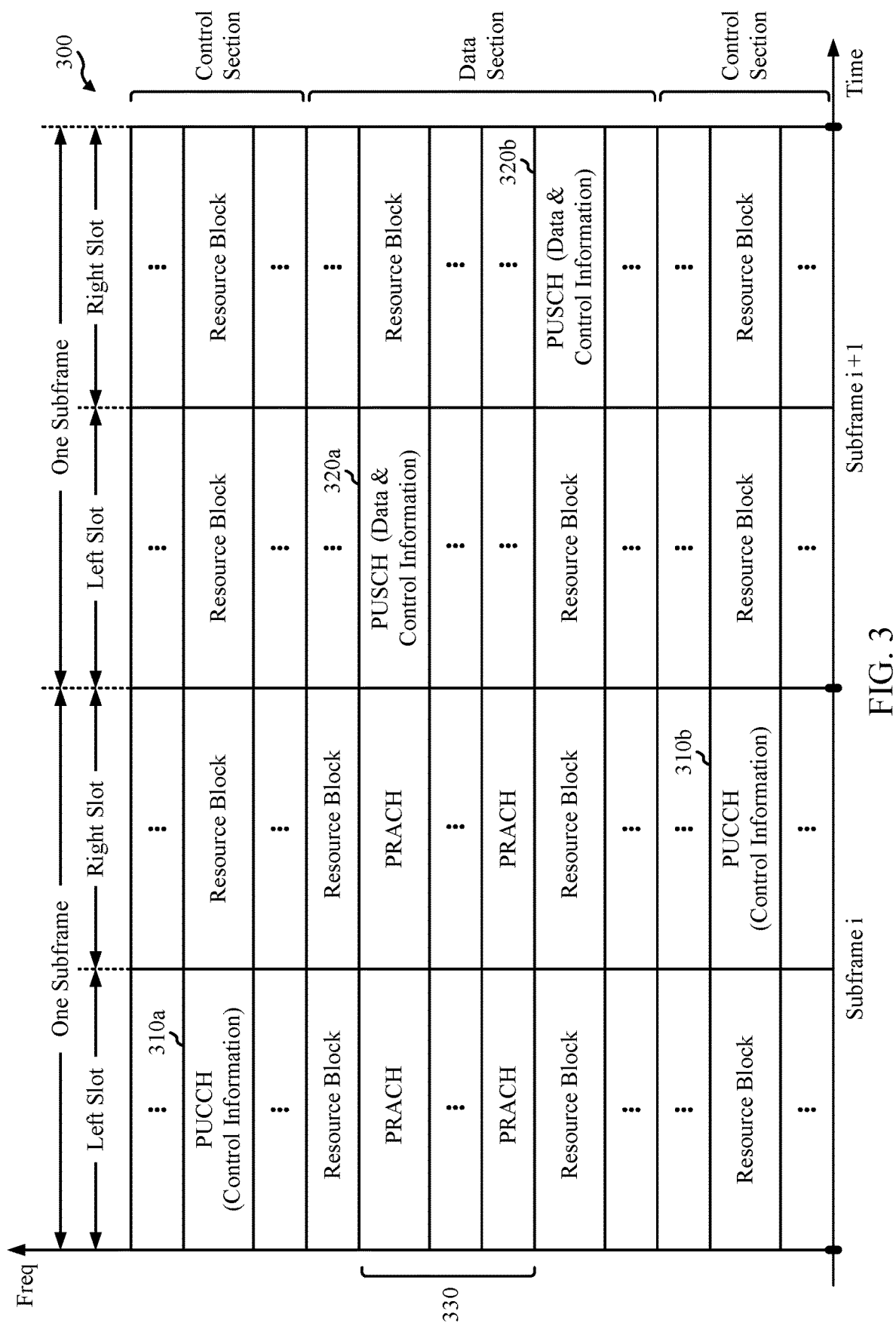
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to a Node B. The UE may also be assigned resource blocks 320a, 320b in the data section to transmit data to the Node B. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
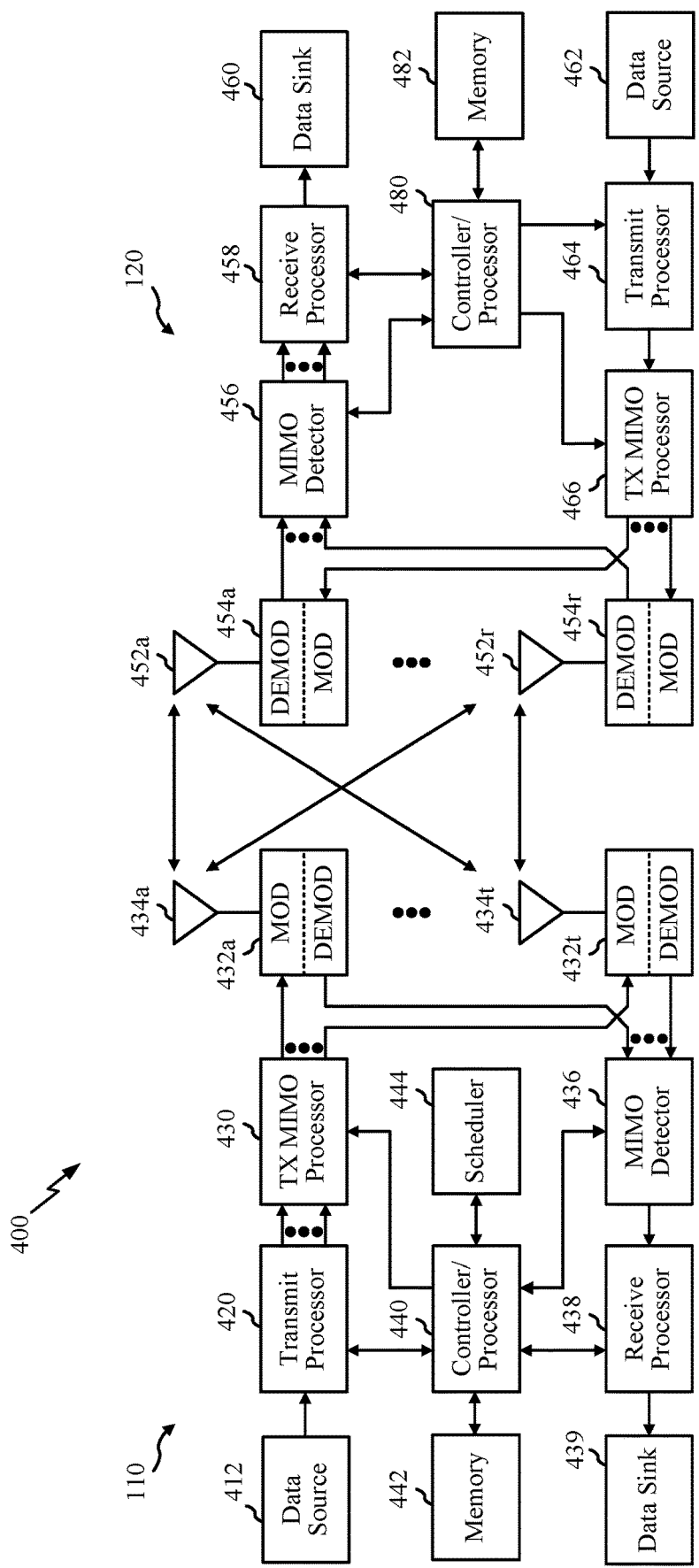
FIG. 4 is a block diagram conceptually illustrating a design of an example Node B and user equipment (UE), according to aspects of the present disclosure.

FIG. 4 illustrates example components of the base station 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 12-13. The BS 110 may comprise a TRP. As illustrated, the BS/TRP 110 and UE 120 may communicate using tone alignment and/or RB definition in a heterogeneous numerology system.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The transmit processor 420 may process (e.g., encode and symbol map) the data and control information to obtain data symbols and control symbols, respectively. The transmit processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively. The transmit processor 420, TX MIMO processor 430, modulators 432a-432t, and antennas 434a-434t may be collectively referred to as a transmit chain of the base station.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480. The receive processor 458, MIMO detector 456, demodulators 454a-454r, and antennas 452a-452t may be collectively referred to as a receive chain of the UE.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. The transmit processor 464, TX MIMO processor 466, modulators 454a-454r, and antennas 452a-452r may be collectively referred to as a transmit chain of the UE. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440. The receive processor 438, MIMO detector 436, demodulators 432a-432t, and antennas 434a-434t may be collectively referred to as a receive chain of the base station.

The controllers/processors 440 and 480 may direct the operation at the base station 110 and the UE 120, respectively. The processor 440 and/or other processors and modules at the base station 110 may perform or direct, e.g., the execution of various processes for the techniques described herein, such as operations 1200 and 1300, described below with reference to FIGS. 12 and 13. The processor 480 and/or other processors and modules at the UE 120 may also perform or direct, e.g., the execution of the functional blocks illustrated in FIG. 12, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
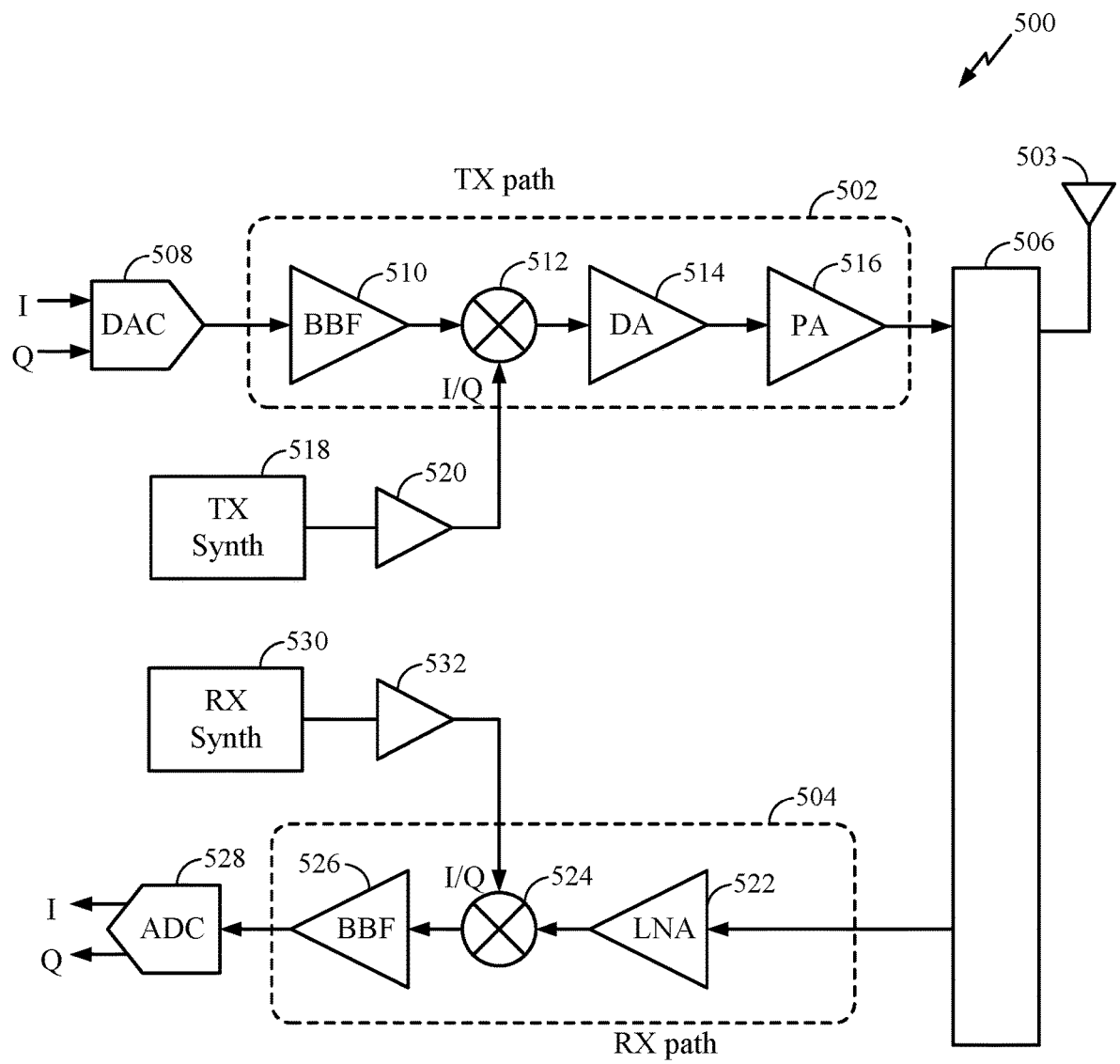
FIG. 5 is a block diagram of an example transceiver front end, in accordance with certain aspects of the present disclosure.

FIG. 5 is a block diagram of an example transceiver front end 500, such as transceiver front ends 222, 254 in FIG. 2, in which aspects of the present disclosure may be practiced. The transceiver front end 500 includes a transmit (TX) path 502 (also known as a transmit chain) for transmitting signals via one or more antennas and a receive (RX) path 504 (also known as a receive chain) for receiving signals via the antennas. When the TX path 502 and the RX path 504 share an antenna 503, the paths may be connected with the antenna via an interface 506, which may include any of various suitable RF devices, such as a duplexer, a switch, a diplexer, and the like.

Receiving in-phase (I) or quadrature (Q) baseband analog signals from a digital-to-analog converter (DAC) 508, the TX path 502 may include a baseband filter (BBF) 510, a mixer 512, a driver amplifier (DA) 514, and a power amplifier (PA) 516. The BBF 510, the mixer 512, and the DA 514 may be included in a radio frequency integrated circuit (RFIC), while the PA 516 may be external to the RFIC. In some aspects of the present disclosure, the BBF 510 may include a tunable active filter as described below. The BBF 510 filters the baseband signals received from the DAC 508, and the mixer 512 mixes the filtered baseband signals with a transmit local oscillator (LO) signal to convert the baseband signal of interest to a different frequency (e.g., upconvert from baseband to RF). This frequency conversion process produces the sum and difference frequencies of the LO frequency and the frequency of the signal of interest. The sum and difference frequencies are referred to as the beat frequencies. The beat frequencies are typically in the RF range, such that the signals output by the mixer 512 are typically RF signals, which may be amplified by the DA 514 and/or by the PA 516 before transmission by the antenna 503.

The RX path 504 includes a low noise amplifier (LNA) 522, a mixer 524, and a baseband filter (BBF) 526. In some aspects of the present disclosure, the BBF 526 may include a tunable active filter as described below. The LNA 522, the mixer 524, and the BBF 526 may be included in a radio frequency integrated circuit (RFIC), which may or may not be the same RFIC that includes the TX path components. RF signals received via the antenna 503 may be amplified by the LNA 522, and the mixer 524 mixes the amplified RF signals with a receive local oscillator (LO) signal to convert the RF signal of interest to a different baseband frequency (i.e., downconvert). The baseband signals output by the mixer 524 may be filtered by the BBF 526 before being converted by an analog-to-digital converter (ADC) 528 to digital I or Q signals for digital signal processing. In certain aspects of the present disclosure, the PA 516 and/or LNA 522 may be implemented using a differential amplifier.

While it is desirable for the output of an LO to remain stable in frequency, tuning the LO to different frequencies typically entails using a variable-frequency oscillator, which involves compromises between stability and tunability. Contemporary systems may employ frequency synthesizers with a voltage-controlled oscillator (VCO) to generate a stable, tunable LO with a particular tuning range. Thus, the transmit LO frequency may be produced by a TX frequency synthesizer 518, which may be buffered or amplified by amplifier 520 before being mixed with the baseband signals in the mixer 512. Similarly, the receive LO frequency may be produced by an RX frequency synthesizer 530, which may be buffered or amplified by amplifier 532 before being mixed with the RF signals in the mixer 524.

Figure 6:
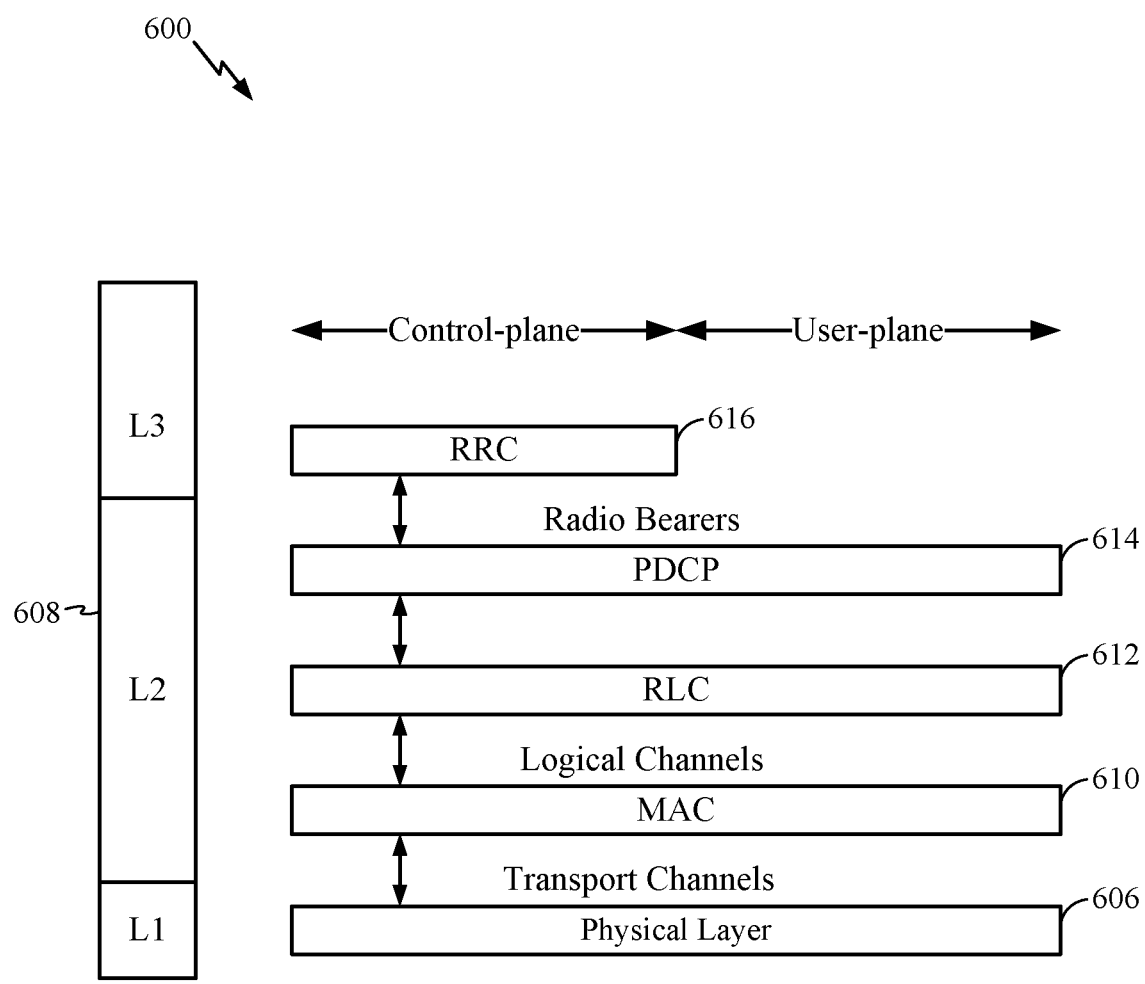
FIG. 6 is a diagram illustrating an example radio protocol architecture for the user and control planes, according to aspects of the present disclosure.

FIG. 6 is a diagram 600 illustrating an example of a radio protocol architecture for the user and control planes in LTE. The radio protocol architecture for the UE and the Node B is shown with three layers: Layer 1, Layer 2, and Layer 3. Layer 1 (L1 layer) is the lowest layer and implements various physical layer signal processing functions. The L1 layer will be referred to herein as the physical layer 606. Layer 2 (L2 layer) 608 is above the physical layer 606 and is responsible for the link between the UE and Node B over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the Node B on the network side. Although not shown, the UE may have several upper layers above the L2 layer 608 including a network layer (e.g., IP layer) that is terminated at a packet data network (PDN) gateway on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between Node Bs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and Node B is substantially the same for the physical layer 606 and the L2 layer 608 with the exception that there is no header compression function for the control plane. The control plane also includes a radio resource control (RRC) sublayer 616 in Layer 3 (L3 layer). The RRC sublayer 616 is responsible for obtaining radio resources (i.e., radio bearers) and for configuring the lower layers using RRC signaling between the Node B and the UE.

Figure 7:
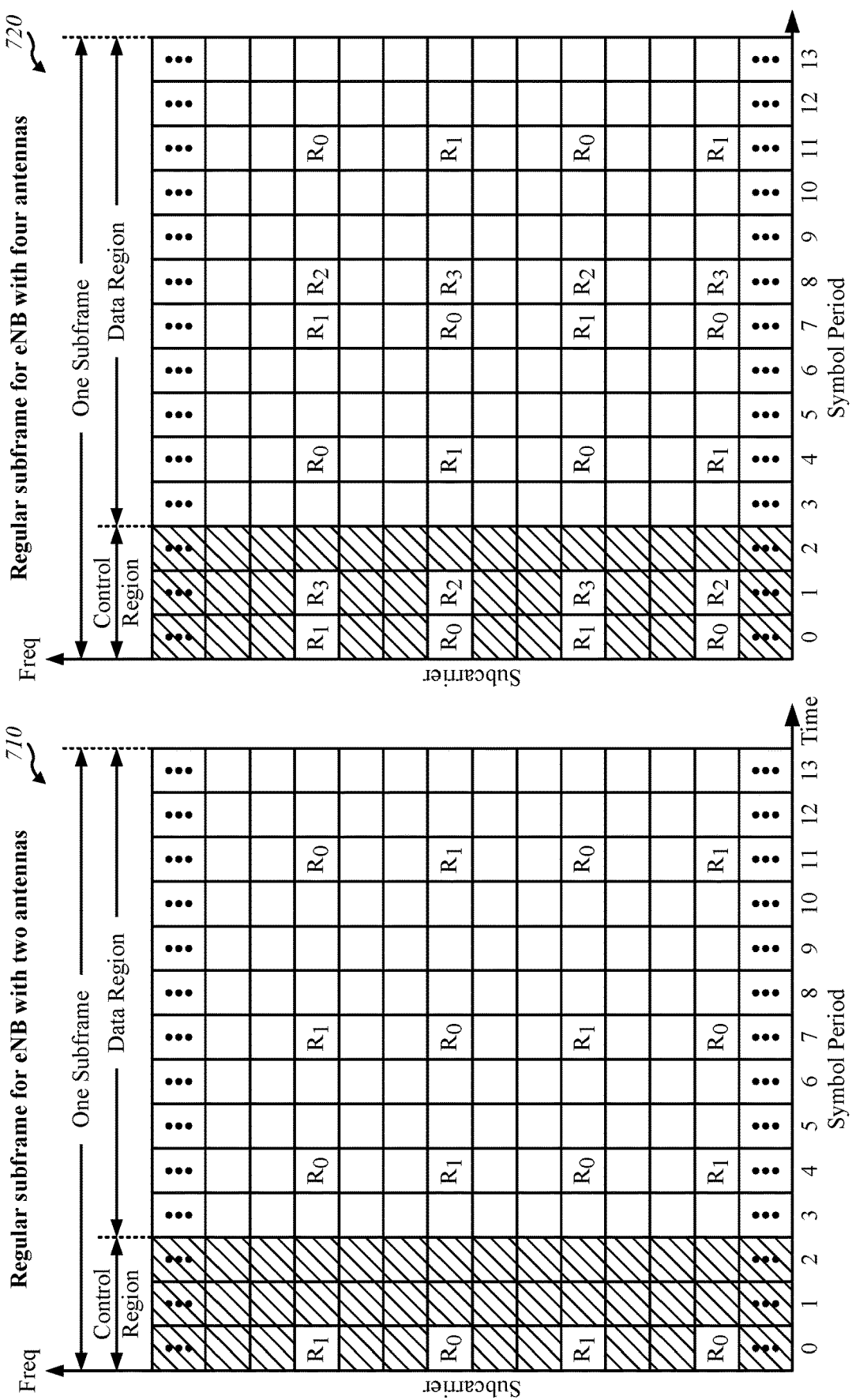
FIG. 7 illustrates an example subframe resource element mapping, according to aspects of the present disclosure.

FIG. 7 shows two exemplary subframe formats 710 and 720 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 710 may be used for a Node B equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 7, for a given resource element with label $R_a$, a modulation symbol may be transmitted on that resource element from antenna a, and no modulation symbols may be transmitted on that resource element from other antennas. Subframe format 720 may be used for a Node B equipped with four antennas. A CRS may be transmitted from antennas 0 and 1 in symbol periods 0, 4, 7 and 11 and from antennas 2 and 3 in symbol periods 1 and 8. For both subframe formats 710 and 720, a CRS may be transmitted on evenly spaced subcarriers, which may be determined based on cell ID. Different Node Bs may transmit their CRSs on the same or different subcarriers, depending on their cell IDs. For both subframe formats 710 and 720, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission (HARQ) for data transmission on the downlink and uplink. For HARQ, a transmitter (e.g., a Node B) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple Node Bs. One of these Node Bs may be selected to serve the UE. The serving Node B may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering Node Bs.

NR cell may refer to a cell operating according in the NR network. A NR Node B (e.g., Node B 110) may correspond to one or multiple transmission reception points (TRPs). As used herein, a cell may refer to a combination of downlink (and potentially also uplink) resources. The linking between the carrier frequency of the downlink resources and the carrier frequency of the uplink resources is indicated in the system information (SI) transmitted on the downlink resources. For example, system information can be transmitted in a physical broadcast channel (PBCH) carrying a master information block (MIB).

NR RAN architecture may include a central unit (CU) (e.g., network controller 130). The CU may be an Access node controller (ANC). The CU terminates backhaul interface to RAN-CN, terminates backhaul interface to neighbor RAN node. The RAN may include a Distributed unit that may be one or more TRPs that may be connected to one or more ANCs (not shown). TRPs may advertise System Information (e.g., Global TRP ID), may include PDCP/RLC/MAC functions, may comprise one or more antenna ports, may be configured to individually (dynamic selection) or jointly (joint transmission), and may serve traffic to the UE.

Heterogeneous numerology wireless communication systems may refer to systems in which UEs may be asynchronous, have different intercarrier spacing and/or have different cyclic prefix lengths. According to aspects of the present disclosure, tones for different numerologies may be aligned. A numerology may be based on a subcarrier spacing and a tone shift. As described herein, regardless of the numerology, the tones from the heterogeneous numerology wireless systems may be frequency-aligned.

According to aspects of the present disclosure, in a beamforming system, a broadcast signal transmitted in a particular direction (e.g., from a BS) may only reach a subset of UEs or other devices. For dynamic TDD operation, a transmitter may transmit a slot or frame format indicator to indicate the slot or frame structure for the next N slots or subframes. However, multiple users (e.g., UEs, BSs) may be scheduled in the N slots or subframes, and the users may share the transmission resources (e.g., the available frequencies for the N slots or subframes) by using TDM or FDM. Those users may have different beamforming or beam pairing association(s) with a transmitter, such as an eNB or a gNB. The transmitter (e.g., a BS, an eNB, a gNB) may transmit a slot or frame format indicator in a few OFDM symbols at the beginning of the N slots or subframes. For non-beamforming systems, transmitting one such indicator (e.g., broadcast to all devices in range) may be sufficient.

Figure 8:
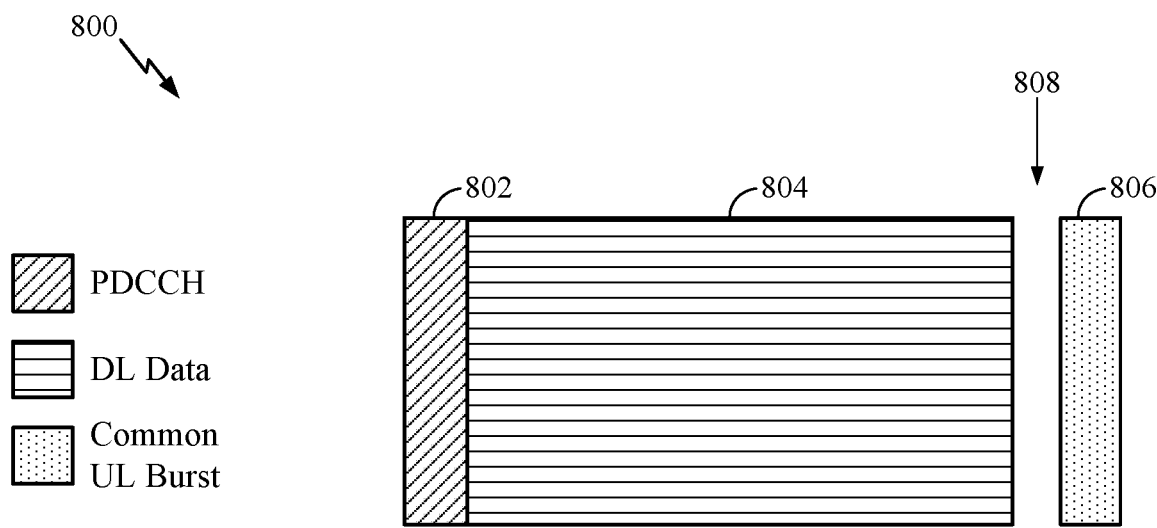
FIG. 8 illustrates an example of a DL-centric subframe, in accordance with certain aspects of the present disclosure.

FIG. 8 is a diagram 800 showing an example of a DL-centric subframe. The DL-centric subframe may include a control portion 802. The control portion 802 may exist in the initial or beginning portion of the DL-centric subframe. The control portion 802 may include various scheduling information and/or control information corresponding to various portions of the DL-centric subframe. In some configurations, the control portion 802 may be a physical DL control channel (PDCCH), as indicated in FIG. 8. The DL-centric subframe may also include a DL data portion 804. The DL data portion 804 may sometimes be referred to as the payload of the DL-centric subframe. The DL data portion 804 may include the communication resources utilized to communicate DL data from the scheduling entity (e.g., UE or BS) to the subordinate entity (e.g., UE). In some configurations, the DL data portion 804 may be a physical DL shared channel (PDSCH).

The DL-centric subframe may also include a common UL portion 806. The common UL portion 806 may sometimes be referred to as an UL burst, a common UL burst, and/or various other suitable terms. The common UL portion 806 may include feedback information corresponding to various other portions of the DL-centric subframe. For example, the common UL portion 806 may include feedback information corresponding to the control portion 802. Non-limiting examples of feedback information may include an ACK signal, a NACK signal, a HARQ indicator, and/or various other suitable types of information. The common UL portion 806 may include additional or alternative information, such as information pertaining to random access channel (RACH) procedures, scheduling requests (SRs), and various other suitable types of information. As illustrated in FIG. 8, the end of the DL data portion 804 may be separated in time from the beginning of the common UL portion 806 by a guard period 808. This guard period may sometimes be referred to as a gap, a guard interval, and/or various other suitable terms. This guard period provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 9:
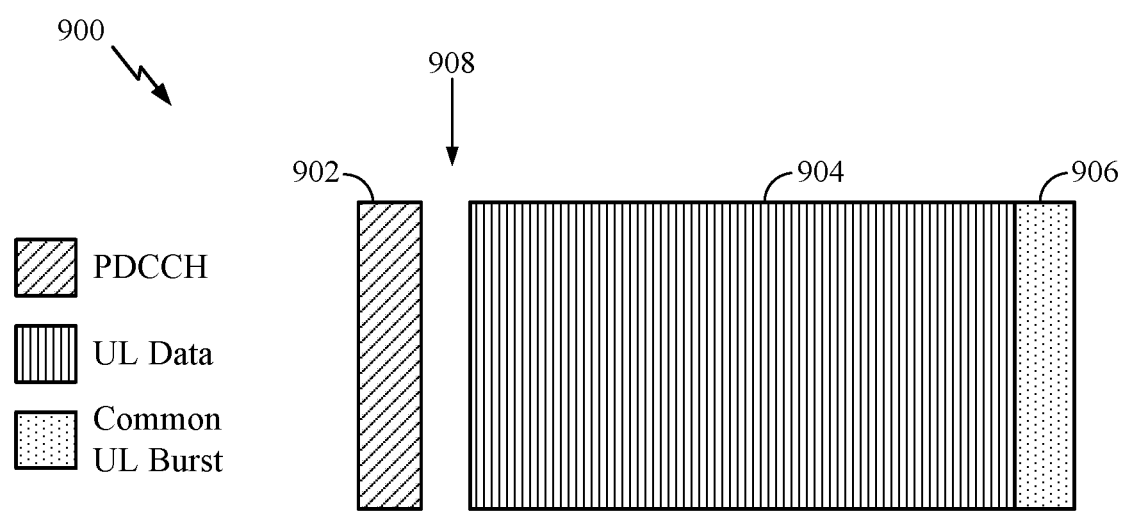
FIG. 9 illustrates an example of an UL-centric subframe, in accordance with certain aspects of the present disclosure.

FIG. 9 is a diagram 900 showing an example of an UL-centric subframe. The UL-centric subframe may include a control portion 902. The control portion 902 may exist in the initial or beginning portion of the UL-centric subframe. The control portion 902 in FIG. 9 may be similar to the control portion described above with reference to FIG. 8. The UL-centric subframe may also include an UL data portion 904. The UL data portion 904 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 902 may be a physical DL control channel (PDCCH).

As illustrated in FIG. 9, the end of the control portion 902 may be separated in time from the beginning of the UL data portion 904 by a guard period 908. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 906. The common UL portion 906 in FIG. 9 may be similar to the common UL portion 806 described above with reference to FIG. 8. The common UL portion 906 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Handling Power Transitions in New Radio

It may be desirable for transmitters in an NR (e.g., 5$^{th}$ Generation Technology Forum (5GTF)) wireless communications system to change a power level in the middle of transmissions. Changing a power level in the middle of a transmission may cause a loss of phase coherence (e.g., of the transmitted waveform). For example, phase coherence may be lost if a power change is not implemented digitally, but is instead implemented via a change in an analog gain stage(s) of a transmit chain. Loss of phase coherence may be more severe in uplink (UL) transmissions than in downlink (DL) transmissions, because mobile devices (e.g., UEs) may have implementation constraints that base stations (e.g., next generation NodeBs (gNBs)) do not have. For example, an amount of digital gain that a mobile device can generate may be less than an amount of digital gain that a base station can generate.

According to aspects of the present disclosure described herein, a device (e.g., a UE or a BS) may transmit a transmission with different power levels for different portions of the transmission (e.g., different power levels for reference signals and data incorporated in an orthogonal frequency domain multiplexing (OFDM) symbol), and the device may take one or more actions to mitigate a phase coherence loss that may result from the changing power level of the transmission. A phase coherence loss may cause a receiver to experience difficulty in receiving and decoding the transmission, so mitigating the potential phase coherence loss may improve data throughput rates and/or reduce error rates of communications.

Figure 10A:
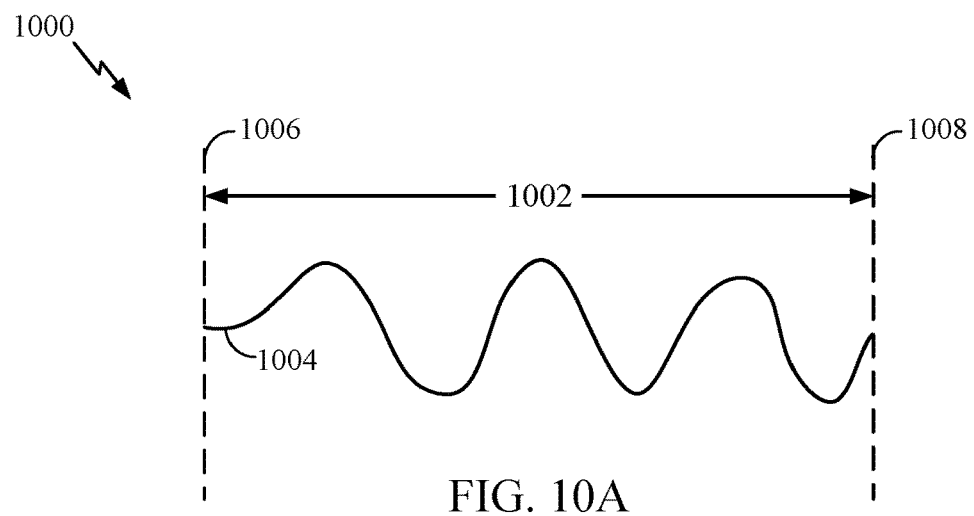
FIGS. 10A-10C illustrate exemplary transmission timelines, according to aspects of the present disclosure.
Figure 10B:
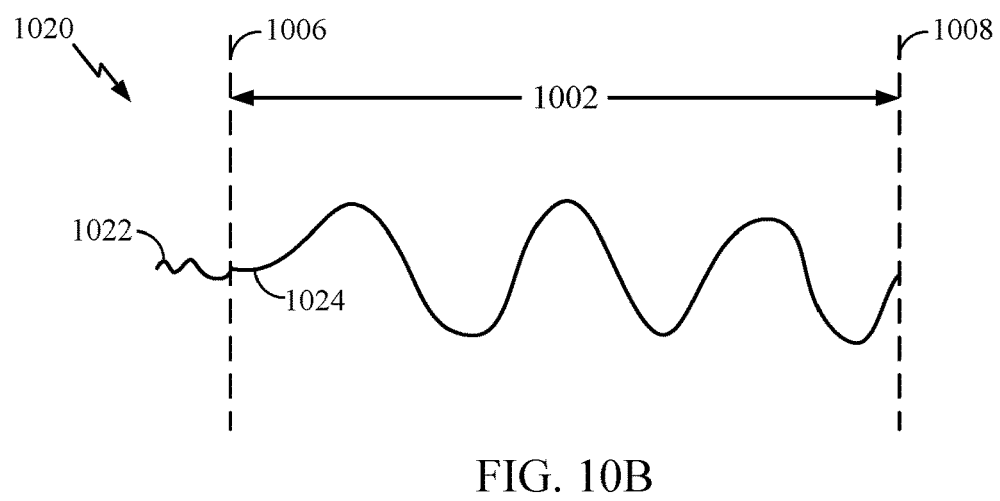
Figure 10C:
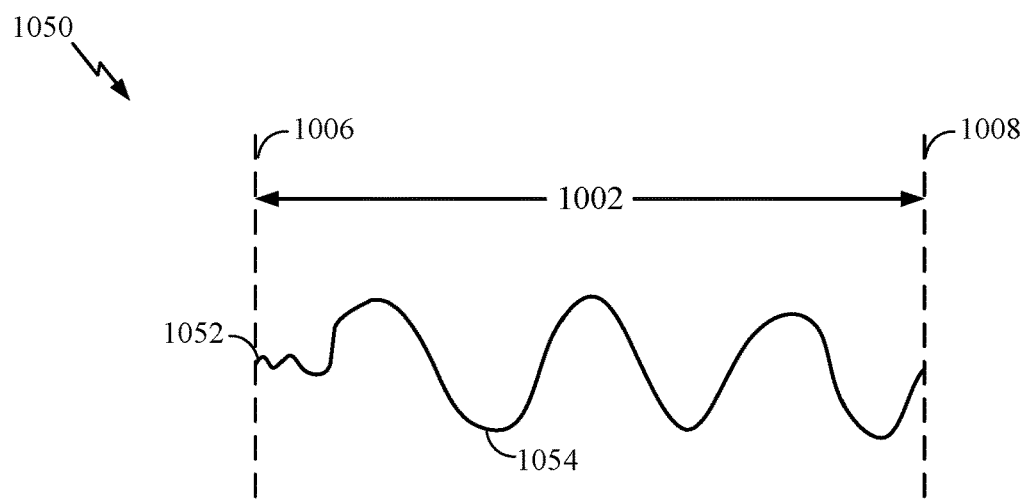

FIGS. 10A-10C illustrate exemplary transmission timelines 1000, 1020, and 1050 illustrative of potential problems that can occur when a device transmits a transmission with different power levels, according to aspects of the present disclosure. In the exemplary timeline 1000, an exemplary ideal waveform 1004 is transmitted in a transmission time interval (TTI) 1002 by an idealized (i.e., not an actual) transmitter. It may be noted that the idealized transmitter does not transmit outside of the TTI 1002 in the exemplary timeline 1000. An idealized transmitter generates the ideal waveform 1004 beginning at 1006 and ending at 1008, while any waveforms generated before 1006 or after 1008 (i.e. in TTIs other than TTI 1002) are completely unaffected by the transmitter's activity during TTI 1002, i.e., any waveforms generated before 1006 or after 1008 are completely independent of the waveform 1004.

In the exemplary timeline 1020 shown in FIG. 10B, an exemplary waveform 1024 is transmitted by an exemplary transmitter (i.e., an actual transmitter, such as a transmitter in UE 120, shown in FIGS. 1 and 4, and not an idealized transmitter, as referred to in FIG. 10A) in the TTI 1002. The exemplary transmitter makes a spurious transmission 1022 before the TTI 1002 begins at 1006, for example, when various components of the transmitter are ramping up to a desired power level. It may be noted that the waveform 1024 is similar to the waveform 1004, shown in FIG. 10A, but the transmitter transmits the spurious transmission 1022 outside of the TTI.

In the exemplary timeline 1050 shown in FIG. 10C, an exemplary waveform 1054 is transmitted by an exemplary transmitter (i.e., an actual transmitter, such as a transmitter in UE 120, shown in FIGS. 1 and 4, and not an idealized transmitter, as referred to in FIG. 10A) in the TTI 1002. The exemplary transmitter makes a spurious transmission 1052 during the TTI 1002 (i.e., after the TTI begins at 1006), for example, when various components of the transmitter are ramping up to a desired power level. It may be noted that the waveform 1054 differs from the waveform 1004, shown in FIG. 10A, due to the spurious transmission 1052, but the transmitter does not transmit outside (i.e., before the beginning 1006 or after the end 1008) of the TTI.

Figure 11:
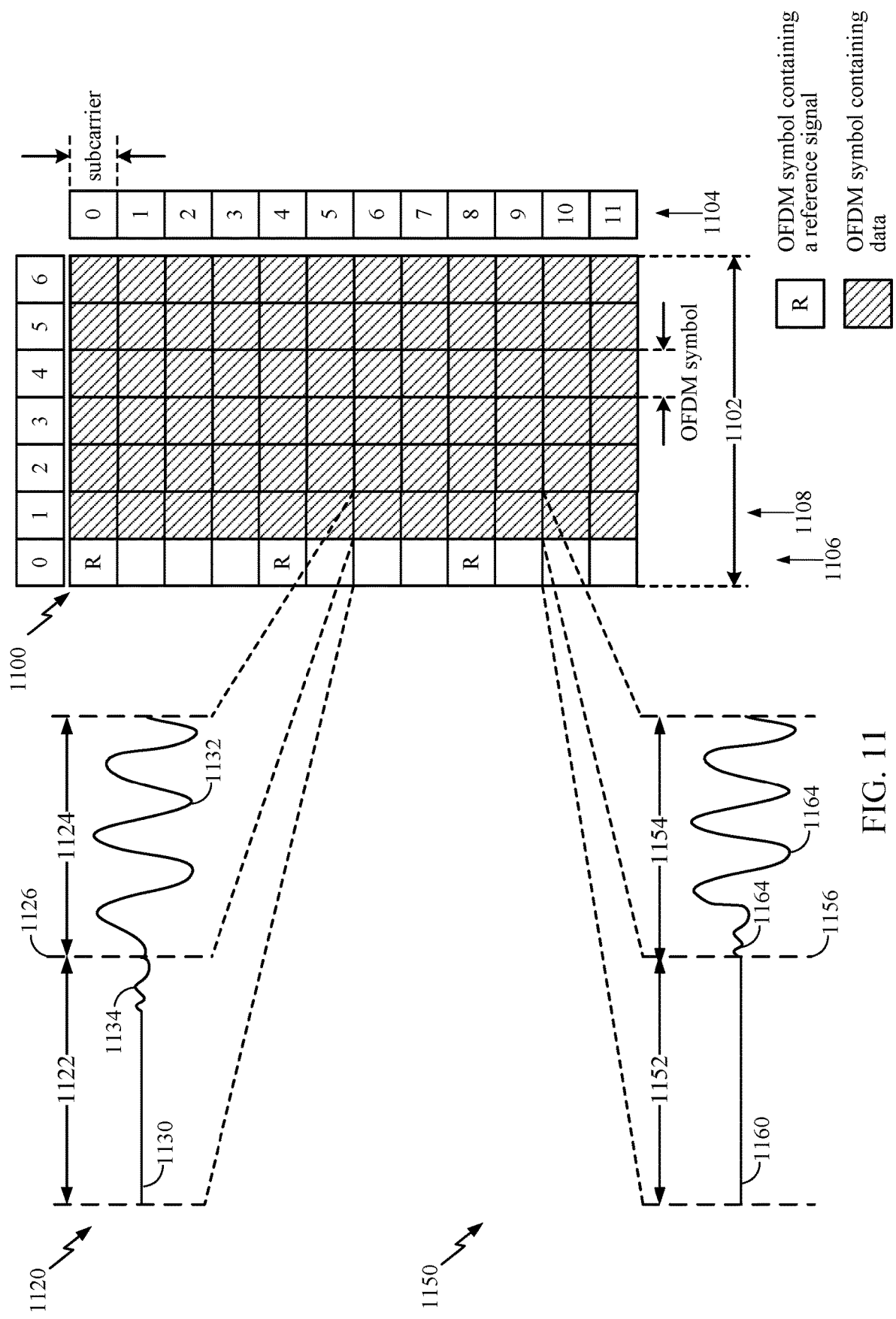
FIG. 11 illustrates an example of an uplink transmission, according to aspects of the present disclosure.

FIG. 11 is a diagram 1100 illustrating an example of an UL transmission (e.g., a PUSCH), according to aspects of the present disclosure. A UE may transmit an uplink transmission in a slot 1102 on a set of subcarriers 1104. A resource grid may be used to represent resource elements of a resource block. As illustrated, a resource block may contain 12 consecutive subcarriers in the frequency domain and 7 consecutive OFDM symbols in the time domain, or 84 resource elements. As illustrated at 1106, the UE may transmit reference signals (e.g., DMRS) on some resource elements of an OFDM symbol, while leaving other REs of the OFDM symbol blank. The UE may transmit data on some or all of the other REs, as shown at 1108.

In the exemplary timeline 1120, the UE leaves the beginning of the first RE 1122 blank, as exemplified by the straight line at 1130. The UE transmits an exemplary waveform 1132 to convey the data of the second RE 1124. Due to the transition from the first (blank) RE 1122 to the second (data) RE 1124, the UE makes a spurious transmission 1134 before the second RE begins at 1126, for example, when various components of a transmitter of the UE are ramping up to a desired power level, similar to the spurious transmission shown in FIG. 10B, described above. The spurious transmission 1134 may interfere with other transmissions that are occurring in that same RE or cause a loss of phase coherence in the transmitted waveform, but does not alter the data transmitted in the RE 1124.

In the exemplary timeline 1150 the UE leaves the first RE 1152 blank, as exemplified by the straight line at 1160. The UE transmits an exemplary wave form 1164 to convey the data of the second RE 1154. Due to the transition from the first (blank) RE 1152 to the second (data) RE 1154, the UE makes a spurious transmission 1164 at the beginning 1156 of the second RE, for example, when various components of a transmitter of the UE are ramping up to a desired power level, similar to the spurious transmission shown in FIG. 10C, described above. The spurious transmission 1164 may cause a loss of phase coherence in the transmitted waveform or a loss of some data in the transmission, but does not interfere with other transmissions in the RE 1152.

Thus, a UE transmitting the exemplary uplink transmission illustrated in FIG. 11 may generate a spurious transmission in an RE that the UE should leave blank, possibly interfering with transmissions by other UEs on that RE, or the UE may generate a spurious transmission in an RE in which the UE is transmitting data, possibly causing a receiver of the transmission to misinterpret the data, e.g., by failing to decode the transmission. In both cases, the sudden change in the power level of the transmission may cause a loss of phase coherence in the generated waveform.

It should be noted that, due to the much shorter slot-lengths used in NR communications systems as compared to previously known communications systems, the spurious transmissions described above may occur in a larger portion of an RE than if the same transmitter were transmitting in previously known (e.g., LTE) communications systems.

According to aspects of the present disclosure, a wireless device may mitigate phase coherence loss related to sudden transitions in transmit power in a transmission by manipulating digital gains in a digital portion of a transmit chain, while leaving analog gains in an analog portion of the transmit chain unchanged.

FIG. 12 illustrates example operations 1200 for wireless communications that may be performed by a wireless device, according to aspects of the present disclosure. The UE may be UE 120 or BS 110, shown in FIG. 1, which may include one or more components illustrated in FIG. 4.

Operations 1200 begin at block 1202 with the wireless device determining to use a first transmit power during a first portion of a transmission and a second transmit power during a second portion of the transmission. For example, UE 120 (shown in FIG. 1) determines to use a first transmit power during a first portion of a PUSCH (e.g., a blank RE in a symbol period containing a demodulation reference signal (DMRS) on other REs of the symbol period) and a second transmit power (e.g., higher than the first transmit power) during a second portion of the PUSCH (e.g., an RE containing data).

At block 1204, operations 1200 continue with the wireless device mitigating a potential phase coherence loss associated with a changing from the first transmit power to the second transmit power. Continuing the example from above, UE 120 mitigates (e.g., increasing digital gains associated with the REs in the symbol period containing the blank REs and DMRS so as to allow analog gains of a transmit chain to remain unchanged from symbol period to symbol period; or selecting a sequence with a low peak-to-average-power-ratio (PAPR) for the DMRS) a potential phase coherence loss associated with a changing from the first transmit power to the second transmit power).

Operations 1200 continue at block 1206 with the wireless device transmitting the first portion of the transmission using the first transmit power and the second portion of the transmission using the second transmit power. Continuing the example from above, UE 120 transmits the first portion of the PUSCH (e.g., the blank RE in the symbol period containing the DMRS on other REs of the symbol period) using the first transmit power and the second portion of the PUSCH (e.g., the RE containing data) using the second transmit power.

FIG. 13 illustrates example operations 1300 for wireless communications that may be performed by a wireless device, according to aspects of the present disclosure. The wireless device may be BS 110 shown in FIG. 1 or a UE that schedules communications for other UEs (e.g., in device-to-device communications), which may include one or more components illustrated in FIG. 4.

Operations 1300 begin at block 1302 with the wireless device transmitting a first grant scheduling a UE to transmit a first transmission, wherein the UE changes from using a first transmit power during a first portion of the first transmission to a second transmit power during a second portion of the first transmission. For example, BS 110 (shown in FIG. 1) transmits a first grant scheduling UE 120 to transmit a first transmission (e.g., a PUSCH), wherein the UE changes from using a first transmit power during a first portion of the first transmission (e.g., an RE containing data) to a second transmit power during a second portion of the first transmission (e.g., an RE containing a DMRS).

At block 1304, operations 1300 continue with the wireless device transmitting a second grant scheduling the UE to transmit a second transmission comprising an indication of at least one of the first transmit power or the second transmit power. Continuing the example from above, the BS 110 transmits a second grant scheduling the UE 120 to transmit a second transmission (e.g., a PUCCH) comprising an indication (e.g., a bit in a field of the PUCCH) of the first transmit power (e.g., the transmit power of the RE containing the data).

Operations 1300 continue at block 1306 with the wireless device receiving the first transmission from the UE, based on the indication. Continuing the example from above, the BS 110 receives the PUSCH from UE 120, based on the indication of the first transmit power from block 1304. That is, the BS receives the PUSCH based on the transmit power indicated by the UE in the second transmission that is scheduled by the second grant.

According to aspects of the present disclosure, in NR wireless communications systems, in some OFDM symbols, certain REs have to be left empty (i.e., transmitted with zero power). Transmitting an OFDM symbol with some REs left empty may be an example of changing from using a first transmit power during a first portion of a transmission to a second transmit power during a second portion of the transmission, as described above with reference to block 1202 in FIG. 12. For example, some REs may be occupied by transmissions by other UEs, such as comb-based SRS transmission, wherein a UE may be assigned all combs on one OFDM symbol but a subset of the combs on the next OFDM symbol. In another example, some REs may be reserved for forward compatibility, and UEs following future versions of the air-interface specifications may use the reserved REs. In yet another example, some REs may be reserved for ultra-reliable low latency communications (URLLC) transmission(s) by other UEs.

In aspects of the present disclosure, if some REs of a transmission are blanked while other REs are sent without any change, overall transmit power in the OFDM symbol is different from transmit power of OFDM symbols without any blanking. This difference in transmit power has a potential to cause a phase discontinuity (e.g., a phase coherence loss, as mentioned above in block 1204 in FIG. 12) in transmissions by a device.

According to aspects of the present disclosure, a transmitting device may blank an entire OFDM symbol, if certain REs of the OFDM symbol have to be blanked. Blanking an entire OFDM symbol may be an example of taking action to mitigate a potential phase coherence loss associated with the changing from the first transmit power to the transmit power, as described above with reference to block 1204 in FIG. 12.

In aspects of the present disclosure, blanking of an entire OFDM symbol may be done digitally (e.g., in a digital domain symbol, such as the I and Q digital signals obtained by the DAC 508 shown in FIG. 5) by a wireless device. Blanking an entire OFDM symbol digitally may result in no loss of phase coherence, because other components of a transmit chain remain energized at a same energy level. However, blanking an entire OFDM symbol may waste transmission resources.

According to aspects of the present disclosure, there may be some residual transmit power transmitted from analog components (e.g., the PA) of a transmit chain of a device that digitally blanks an entire OFDM symbol.

In aspects of the present disclosure, communications systems operating according to disclosed techniques may use new rules limiting these emissions (e.g., residual transmit power) that may be more relaxed than the transmit power limits when the UE is more "fully" turned off (i.e., off for longer contiguous time durations).

According to aspects of the present disclosure, a transmitting device may blank REs in a digital domain signal prior to converting the digital domain signal to an analog domain signal for transmission. Blanking REs in a digital domain signal prior to converting the digital domain signal to an analog domain signal for transmission may be an example of taking action to mitigate a potential phase coherence loss associated with the changing from the first transmit power to the transmit power, as described above with reference to block 1204 in FIG. 12. If a device blanks REs in a digital domain, though a total transmit power changes, analog gains of the transmit chain are unchanged, resulting in no loss of phase coherence. This may cause suboptimal analog gain settings for the resulting transmit power. The suboptimal analog gain setting may impact quality (e.g., calculation of error vector magnitude (EVM)) of the resulting transmission.

According to aspects of the present disclosure, a transmitting device may boost power of un-blanked REs in a digital domain signal prior to converting the digital domain signal to an analog domain signal for transmission, in order to preserve overall transmit power at a consistent level. Boosting power of un-blanked REs in a digital domain signal prior to converting the digital domain signal to an analog domain signal for transmission may be an example of taking action to mitigate a potential phase coherence loss associated with the changing from the first transmit power to the second transmit power, as described above with reference to block 1204 in FIG. 12. Boosting power of un-blanked REs in a digital domain signal may result in analog gains of a transmit chain of the device remaining unchanged and total transmit power of the transmission being unchanged from symbol period to symbol period. If analog gains of the transmit chain remain unchanged, then there may be no loss of phase coherence. In aspects of the present disclosure, boosting power of un-blanked REs may not always be possible, for example, if digital domain gains of a transmitting device are already at their maximum settings.

In aspects of the present disclosure, a device taking action to mitigate a potential phase coherence loss may use a combination of the techniques described earlier. For example, a device may always boost the power of unblanked REs to keep total power unchanged, regardless of whether or not such boosting can be done purely digitally, by incurring some possible performance loss due to loss of phase coherence whenever digital boosting is infeasible. In such a case, the receiving device knows the power level of the OFDM symbols containing the blanked REs relative to other OFDM symbols without blanked REs. In another example, a transmitting device may boost power only to the extent possible digitally (e.g., to the maximum setting of the digital domain gains) and keep analog gains unchanged. A receiving device may not then know the amount of boost applied, as the receiver is typically unaware of digital settings at the transmitter.

According to aspects of the present disclosure, digital domain gain settings of a transmitting device may be dynamic, depending on a current transmission power level and other factors, such as TX chain selection across multiple radio access technologies (RATs) at the transmitter.

In aspects of the present disclosure, a transmitting device may signal a level of transmit power boost applied to a transmission to an intended receiver of the transmission. Signaling of a level of transmit power may be important to a receiver for certain types of transmissions. For example, for SRS transmissions, the relative transmit power boosts applied on different OFDM symbols are used by a receiver of the SRS to compare channel quality estimated from the SRS. In another example, for data transmissions, especially long ones, a change in power level for one OFDM symbol may be less important for the receiver to know about.

According to aspects of the present disclosure, signaling of transmit power levels may be made in a different transmission time interval (TTI) than the transmission with the boosted transmit power levels. For example, if SRS processing (e.g., by a base station) is not time-critical, then SRS transmit power levels may be indicated in a suitable 'nearby in time' PUCCH transmission from a transmitting UE.

In aspects of the present disclosure, if there is no 'nearby in time' PUCCH or UL control transmission for a UE to use to signal a transmit power level, then a PUCCH or other UL control transmission for signaling transmit power levels may be scheduled explicitly by a base station. Explicit scheduling of UL control transmissions for signaling transmit power levels may require extra overhead.

According to aspects of the present disclosure, signaling of transmit power levels may be enabled and/or disabled, depending on a transmission type of the transmission, including waveform, transmission contents, and transmission power of the transmission.

According to aspects of the present disclosure, transmitting using pi/2 binary phase shift keying (pi/2-BPSK or Π/2-BPSK) modulation together with a discrete Fourier transform single-carrier orthogonal frequency division multiplexing (DFT-s-OFDM) waveform has a significantly lower peak-to-average-power-ratio (PAPR) than transmitting using quadrature phase shift keying (QPSK) modulation. Transmitting with pi/2-BPSK modulation and a DFT-s-OFDM waveform also has a lower PAPR than Zadoff-Chu sequences chosen explicitly for their low PAPR for demodulation reference signals (DMRS) in LTE UL transmissions.

In aspects of the present disclosure, re-using Zadoff-Chu sequences for DMRS transmissions may require special handling, because of the Zadoff-Chu sequences having a higher PAPR than a pi/2-BPSK DFT-s-OFDM waveform used for conveying data in a same period as the DMRS.

In aspects of the present disclosure, if a new radio transmitting device uses a Zadoff-Chu sequence for DMRS transmissions (e.g., similar to an LTE transmitting device), the transmitting device may apply a different power amplifier (PA) back-off for DMRS (e.g., DMRS based on Zadoff-Chu sequences that have a higher PAPR than a pi/2-BPSK DFT-s-OFDM waveform) REs in a transmission than the transmitting device uses for REs conveying data in the transmission. This may result in a different transmit power for REs conveying data and for DMRS in the transmission, again possibly causing a phase discontinuity (e.g., loss of phase coherence) in the transmission.

According to aspects of the present disclosure, the same techniques described above (e.g., blanking of an entire OFDM symbol in the digital domain or by other techniques, blanking REs in a digital domain signal prior to converting the digital domain signal to an analog domain signal, and/or boosting power of un-blanked REs in a digital domain signal prior to converting the digital domain signal to an analog domain signal) may be used by a transmitting device to prevent a potential loss of phase coherence between reference signals (e.g., DMRS) in a transmission and REs conveying data in the transmission.

In aspects of the present disclosure, a transmitting device may change transmit power only in a digital domain signal to mitigate a potential loss of phase coherence between reference signals (e.g., DMRS) in a transmission and REs conveying data in the transmission. Additionally, a transmitting device may signal to a receiving device a resulting ratio of data RE transmit power to DMRS RE transmit power (e.g., a transmit power ratio (TPR)) used by the transmitting device.

According to aspects of the present disclosure, signaling of the resulting ratio of data RE transmit power to DMRS RE transmit power described above may be optional in a communications system and used only in certain conditions. Determination of whether the signaling of the resulting ratio of data RE transmit power to DMRS transmit power is enabled for a transmission may depend on the transmission contents and/or power level.

In aspects of the present disclosure, signaling of the resulting ratio of data RE transmit power to DMRS RE transmit power may be avoided by applying a fixed TPR (less power for DMRS based on Zadoff-Chu sequences than data on pi/2-BPSK DFT-s-OFDM waveforms, or de-boosting of DMRS relative to data) regardless of transmit power level, i.e., regardless of whether or not the PA is close to saturation. In such cases, a phase discontinuity caused by the change in transmit power can be avoided by lowering the transmit power digitally. Further, to combat the possibility of the receiver having difficulty estimating the channel because of the lower DMRS power, such transmissions may use a DMRS pattern with higher DMRS overhead, for example, more TDM DMRS OFDM symbols. The DMRS pattern and overhead for low PAPR waveforms requiring such DMRS de-boosting may be configured by RRC signaling, or may be implicitly derived based on the modulation and coding scheme (MCS) and/or waveform of the transmission. That is, the UE may determine an implicit derivation of the DMRS pattern and overhead, based on the MCS and/or waveform of the transmission. For example, a UE may be configured such that when the MCS of an UL transmission from the UE indicates the transmission is to be transmitted using pi/2-BPSK modulation with a DFT-s-OFDM waveform, the UE is to transmit one or more additional DMRS OFDM symbols in a time division multiplexing manner with the data of the UL transmission. In the example, the number of additional DMRS OFDM symbols may be indicated to the UE by RRC signaling.

According to aspects of the present disclosure, a transmitting device may use another DMRS sequence (i.e., other than a Zadoff-Chu sequence) with a PAPR comparable to or lower than the PAPR of pi/2-BPSK modulated data.

In aspects of the present disclosure, pi/2-BPSK DFT-s-OFDM transmissions from multiple UEs may be multiplexed together in the same RBs. That, is multiple UEs may transmit different pi/2 DFT-s-OFDM transmissions via a set of RBs. In this case, it is desirable that DMRS included in the transmissions from the UEs be orthogonal, so that a receiving device may differentiate between the DMRS of each of the UEs. For DMRS based on Zadoff-Chu sequences that are populated directly in the frequency domain (e.g., at an input of an inverse fast Fourier transform (IFFT) in a transmit chain), the DMRS could be orthogonalized by a combination of using different frequency combs (e.g., each UE transmits its DMRS on an equi-spaced, non-contiguous set of tones selected from sets of equi-spaced, non-contiguous sets of tones that are multiplexed in the set of RBs in a frequency division multiplexing (FDM) manner), different OFDM symbols (e.g., each UE transmits its DMRS in a different OFDM symbol in the set of RBs in a time division multiplexing (TDM) manner), and/or orthogonal cover codes (OCC) applied (e.g., each UE transmits its DMRS using a different OCC in a code division multiplexing (CDM) manner) across time or across frequency. For special DMRS sequences created using pi/2-BPSK DFT-s-OFDM modulation (e.g., sequences different from Zadoff-Chu sequences and generated to have a low PAPR comparable to the PAPR of pi/2-BPSK modulated data symbols), both the population of the sequence onto a comb and the application of the OCC across frequency may result in a DMRS time-domain sequence that is not a pi/2-BPSK waveform, thus increasing the PAPR. Hence, special constructions may be employed in the comb and OCC application process to avoid a PAPR increase and, if possible, preserve the pi/2-BPSK property of the special DMRS sequences.

For example, a pi/2-BPSK sequence input to a DFT-spreading component of a transmit chain may result in a time-interpolated pi/2-BPSK sequence after a DFT-spreading operation and OFDM IFFT operation of the transmit chain, when the output of the DFT-spreading component is populated on a certain contiguous set of tones. If the output of the DFT-spreading component is instead populated on a comb of tones, then this low PAPR property may continue to hold for certain combs, wherein the time domain waveform is a time-compressed and repeated version of an interpolated pi/2-BPSK sequence with the number of repetitions corresponding to the comb period. For other combs, the output may be the result of applying a time-domain phase ramp to such a waveform. This phase ramp implies that the time domain waveform is no longer an interpolated pi/2-BPSK waveform, and may have a worse PAPR. To avoid this issue, the time-compressed and repeated version of the sequence obtained when the pi/2-BPSK property is preserved may further be processed by applying a phase-shift to the various repetitions, with the phase shift being the same within each repetition but different across different repetitions. In some cases, this application of phase shifts across repetitions may still preserve the pi/2-BPSK waveform property. In other cases, this pi/2-BPSK waveform property may be preserved within each repetition, although it may be lost at the time-boundary between the repetitions. In both cases, this application of phase shifts across repetitions shifts the waveform onto a different FDM comb without the need to apply a continuous phase ramp that more strongly destroys the pi/2-BPSK waveform property.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product/computer readable medium for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
determining to use a first transmit power during a first portion of a physical uplink shared channel (PUSCH) transmission and a second transmit power during a second portion of the PUSCH transmission, the second transmit power different from the first transmit power;
mitigating a potential phase coherence loss associated with changing from transmitting the first portion of the PUSCH transmission at the first transmit power to transmitting the second portion of the PUSCH transmission at the second transmit power different from the first transmit power, wherein mitigating the potential phase coherence loss comprises blanking one or more resource elements (REs) in a digital domain signal for the PUSCH transmission prior to converting the digital domain signal for the PUSCH transmission to an analog domain signal for the PUSCH transmission; and
transmitting the first portion of the PUSCH transmission using the first transmit power and the second portion of the PUSCH transmission using the second transmit power different from the first transmit power.

2. The method of claim 1, wherein mitigating the potential phase coherence loss comprises blanking an orthogonal frequency domain multiplexing (OFDM) symbol in the PUSCH transmission.

3. The method of claim 1, wherein mitigating the potential phase coherence loss further comprises:
boosting a power level of one or more other REs.

4. The method of claim 3, wherein boosting the power level of the one or more other REs comprises boosting the power level of the one or more REs in the digital domain signal prior to converting the digital domain signal to the analog domain signal.

5. The method of claim 3, further comprising:
sending an indication of the power level.

6. The method of claim 5, wherein the indication is sent via an uplink (UL) control signal.

7. The method of claim 6, further comprising:
receiving a downlink control channel scheduling the UL control signal.

8. The method of claim 1, wherein mitigating the potential phase coherence loss further comprises:
selecting a sequence for a demodulation reference signal (DMRS) of the PUSCH transmission with a peak-to-average-power-ratio (PAPR) less than or equal to a PAPR of a low PAPR waveform for conveying data in the PUSCH transmission.

9. The method of claim 8, wherein the low PAPR waveform uses pi/2 binary phase shift keying (pi/2-BPSK) modulation with a discrete Fourier transform single-carrier orthogonal frequency division multiplexing (DFT-s-OFDM) waveform.

10. The method of claim 8, wherein the low PAPR waveform uses modifications to allow the low PAPR to be preserved when the low PAPR waveform occupies an interleaved set of frequency tones or occupies multiple orthogonal frequency division multiplexing (OFDM) symbols across which an orthogonal cover code is applied.

11. The method of claim 8, further comprising:
deriving a pattern and an overhead of the DMRS based on a combination of:
radio resource control (RRC) signaling, and
an implicit determination that is based on at least one of a modulation and coding scheme (MCS) and a waveform for conveying the data.

12. The method of claim 1, wherein the first portion of the PUSCH transmission comprises a demodulation reference signal (DMRS), and wherein mitigating the potential phase coherence loss further comprises:
applying a different power amplifier (PA) backoff for the first portion of the PUSCH transmission than another PA backoff for the second portion of the PUSCH transmission.

13. The method of claim 1, wherein the first portion of the PUSCH transmission comprises a demodulation reference signal (DMRS), and wherein mitigating the potential phase coherence loss further comprises:
applying a fixed power ratio between a power for the DMRS and a power for the second portion of the PUSCH transmission.

14. The method of claim 13, wherein applying the fixed power ratio between the DMRS power and the power of the second portion of the PUSCH transmission comprises applying the fixed power ratio between the DMRS power and the power of the second portion of the PUSCH transmission regardless of an available power headroom remaining at a power amplifier (PA) output.

15. The method of claim 1, wherein:
the first portion of the PUSCH transmission comprises a demodulation reference signal (DMRS); and
the second portion of the PUSCH transmission comprises a data portion.

16. An apparatus for wireless communications, comprising:
a processor configured to:
determine to use a first transmit power during a first portion of a physical uplink shared channel (PUSCH) transmission and a second transmit power during a second portion of the PUSCH transmission, the second transmit power different from the first transmit power;
mitigate a potential phase coherence loss associated with changing from transmitting the first portion of the PUSCH transmission at the first transmit power to transmitting the second portion of the PUSCH transmission at the second transmit power different from the first transmit power, wherein the processor being configured to mitigate the potential phase coherence loss comprises the processor being configured to blank one or more resource elements (REs) in a digital domain signal for the PUSCH transmission prior to converting the digital domain signal for the PUSCH transmission to an analog domain signal for the PUSCH transmission; and
transmit the first portion of the PUSCH transmission using the first transmit power and the second portion of the PUSCH transmission using the second transmit power different from the first transmit power; and a memory coupled with the processor.

17. The apparatus of claim 16, wherein:
the first portion of the PUSCH transmission comprises a demodulation reference signal (DMRS); and
the second portion of the PUSCH transmission comprises a data portion.

18. The apparatus of claim 16, wherein the processor being configured to mitigate the potential phase coherence loss comprises the processor being configured to blank an orthogonal frequency domain multiplexing (OFDM) symbol in the PUSCH transmission.

19. The apparatus of claim 16 wherein the processor being configured to mitigate the potential phase coherence loss comprises the processing being configured to boost a power level of one or more other REs.

20. The apparatus of claim 19, wherein the processor being configured to boost the power level of the one or more other REs comprises the processor being configured to boost the power level of the one or more REs in the digital domain signal prior to converting the digital domain signal to the analog domain signal.

21. The apparatus of claim 19, wherein the processor is configured to:
send an indication of the power level.

22. The apparatus of claim 21, wherein the processor is configured to:
send the indication via an uplink (UL) control signal.

23. The apparatus of claim 22, wherein the processor is configured to:
receive a downlink control channel scheduling the UL control signal.

24. The apparatus of claim 16, wherein the processor being configured to mitigate the potential phase coherence loss comprises the processor being configured to:
select a sequence for a demodulation reference signal (DMRS) of the PUSCH transmission with a peak-to-average-power-ratio (PAPR) less than or equal to a PAPR of a low PAPR waveform for conveying data in the PUSCH transmission.

25. The apparatus of claim 24, wherein:
the low PAPR waveform uses pi/2 binary phase shift keying (pi/2-BPSK) modulation with a discrete Fourier transform single-carrier orthogonal frequency division multiplexing (DFT-s-OFDM) waveform; and
the processor is configured to transmit at least one of the first portion of the PUSCH transmission and the second portion of the PUSCH transmission using the low PAPR waveform.

26. The apparatus of claim 24, wherein:
the low PAPR waveform uses modifications to allow the low PAPR to be preserved when the low PAPR waveform occupies an interleaved set of frequency tones or occupies multiple orthogonal frequency division multiplexing (OFDM) symbols across which an orthogonal cover code is applied; and the processor is configured to transmit at least one of the first portion of the PUSCH transmission and the second portion of the PUSCH transmission using the low PAPR waveform.

27. The apparatus of claim 24, wherein the processor is further configured to:
  determine an implicit derivation of a pattern and a potential overhead of the DMRS based on at least one of a modulation and coding scheme (MCS) and a waveform for conveying the data; and
  derive the pattern and overhead of the DMRS based on a combination of:
    radio resource control (RRC) signaling, and
    the implicit derivation.

28. The apparatus of claim 16, wherein the first portion of the PUSCH transmission comprises a demodulation reference signal (DMRS), and wherein the processor is configured to mitigate the potential phase coherence loss by:
  applying a different power amplifier (PA) backoff for the first portion of the PUSCH transmission than another PA backoff for the second portion of the PUSCH transmission.

29. The apparatus of claim 16, wherein the first portion of the PUSCH transmission comprises a demodulation reference signal (DMRS), and wherein the processor is configured to mitigate the potential phase coherence loss by:
  applying a fixed power ratio between a power for the DMRS and a power for the second portion of the PUSCH transmission.

30. The apparatus of claim 29, wherein the processor is configured to apply the fixed power ratio between the DMRS power and the power of the second portion of the PUSCH transmission by applying the fixed power ratio between the DMRS power and the power of the second portion of the PUSCH transmission regardless of an available power headroom remaining at a power amplifier (PA) output.

31. An apparatus for wireless communications, comprising:
  means for determining to use a first transmit power during a first portion of a physical uplink shared channel (PUSCH) transmission and a second transmit power during a second portion of the PUSCH transmission, the second transmit power different from the first transmit power;
  means for mitigating a potential phase coherence loss associated with changing from transmitting the first portion of the PUSCH transmission at the first transmit power to transmitting the second portion of the PUSCH transmission at the second transmit power different from the first transmit power, wherein means for mitigating the potential phase coherence loss comprises means for blanking one or more resource elements (REs) in a digital domain signal for the PUSCH transmission prior to converting the digital domain signal for the PUSCH transmission to an analog domain signal for the PUSCH transmission; and
  means for transmitting the first portion of the PUSCH transmission using the first transmit power and the second portion of the PUSCH transmission using the second transmit power different from the first transmit power.

32. A non-transitory computer-readable medium having computer executable code stored thereon for:
  determining to use a first transmit power during a first portion of a physical uplink shared channel (PUSCH) transmission and a second transmit power during a second portion of the PUSCH transmission, the second transmit power different from the first transmit power;
  mitigating a potential phase coherence loss associated with changing from transmitting the first portion of the PUSCH transmission at the first transmit power to transmitting the second portion of the PUSCH transmission at the second transmit power different from the first transmit power, wherein mitigating the potential phase coherence loss comprises blanking one or more resource elements (REs) in a digital domain signal for the PUSCH transmission prior to converting the digital domain signal for the PUSCH transmission to an analog domain signal for the PUSCH transmission; and
  transmitting the first portion of the PUSCH transmission using the first transmit power and the second portion of the PUSCH transmission using the second transmit power different from the first transmit power.

* * * * *